United States Patent
Sakai

(10) Patent No.: US 12,277,700 B2
(45) Date of Patent: Apr. 15, 2025

(54) INSPECTION APPARATUS CAPABLE OF REDUCING INSPECTION WORKLOAD, METHOD OF CONTROLLING INSPECTION APPARATUS, AND STORAGE MEDIUM

(71) Applicant: CANON KABUSHIKI KAISHA, Tokyo (JP)

(72) Inventor: Hiroyuki Sakai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 344 days.

(21) Appl. No.: 17/887,760

(22) Filed: Aug. 15, 2022

(65) Prior Publication Data
US 2023/0061533 A1 Mar. 2, 2023

(30) Foreign Application Priority Data
Aug. 25, 2021 (JP) ................................ 2021-137282

(51) Int. Cl.
*G06T 7/00* (2017.01)
(52) U.S. Cl.
CPC .... *G06T 7/001* (2013.01); *G06T 2207/30144* (2013.01)
(58) Field of Classification Search
CPC ........... G06T 7/001; G06T 2207/30144; G06T 7/0002; G06T 2207/10024; G06T 2207/30176
USPC ....................................................... 382/112
See application file for complete search history.

(56) References Cited

U.S. PATENT DOCUMENTS

| | | | | |
|---|---|---|---|---|
| 8,059,858 B2* | 11/2011 | Brundage | ............... | G07F 7/086 382/116 |
| 8,879,075 B2 | 11/2014 | Kaisha | | |
| 2007/0139703 A1* | 6/2007 | Shimamura | .......... | G06V 10/993 358/1.11 |
| 2013/0345502 A1* | 12/2013 | Mitsunaga | ........... | A61B 1/0002 600/109 |
| 2014/0254886 A1* | 9/2014 | Plettinck | ............... | G06F 3/1244 382/112 |
| 2015/0355102 A1* | 12/2015 | Kido | ..................... | G06T 7/0004 348/46 |
| 2022/0261975 A1* | 8/2022 | Hershman | ............. | G06F 3/1219 |
| 2022/0309634 A1* | 9/2022 | Atwood | ................. | G06V 10/82 |

FOREIGN PATENT DOCUMENTS

JP 2012206461 A 10/2012

* cited by examiner

*Primary Examiner* — Ali Bayat
(74) *Attorney, Agent, or Firm* — ROSSI, KIMMS & McDOWELL LLP

(57) ABSTRACT

An inspection apparatus that is capable of reducing a workload of an inspection operator. The inspection apparatus performs inspection of a print product. An image reading section reads the print product and generates a scanned image of the print product. A reference image analysis section detects a line region and a photo region from the scanned image. The detected line region is determined as one of a character region and a bar code region. Settings of the inspection of the print product are set based on a result of the detection and a result of the determination. The inspection of the print product is performed based on the settings of the inspection.

10 Claims, 20 Drawing Sheets

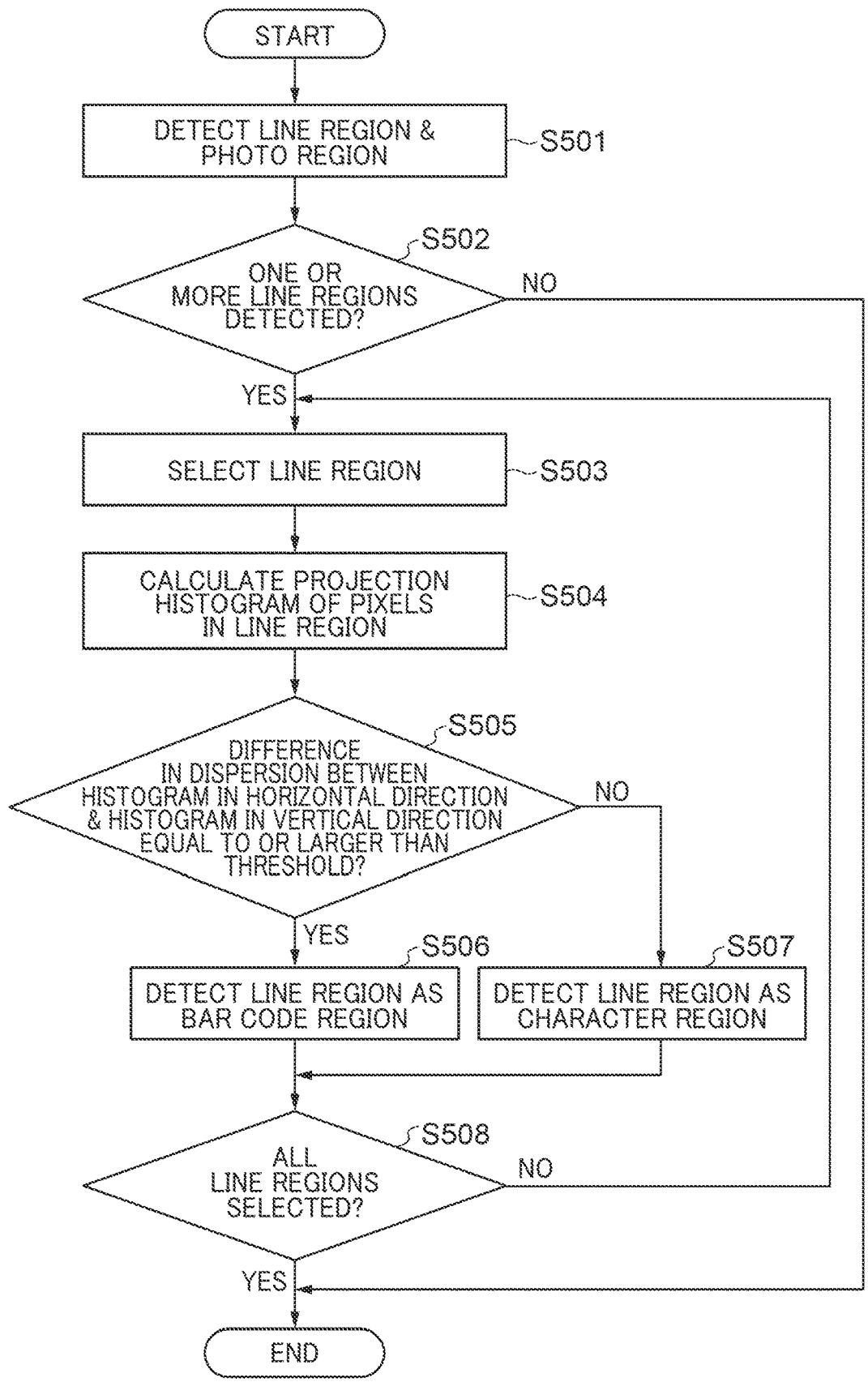

FIG. 6D

| ID | ATTRIBUTE | COORDINATES OF UPPER LEFT CORNER OF REGION | COORDINATES OF LOWER RIGHT CORNER OF REGION |
|---|---|---|---|
| 0 | PHOTO | 100,50 | 200,250 |
| 1 | BAR CODE | 50,300 | 150,350 |
| 2 | CHARACTER | 120,400 | 220,430 |

607

*FIG. 7A1*
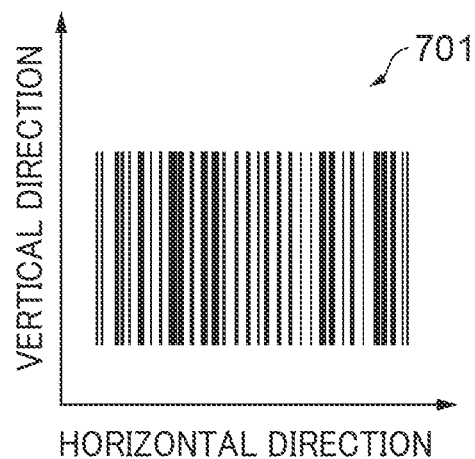
*FIG. 7A2*
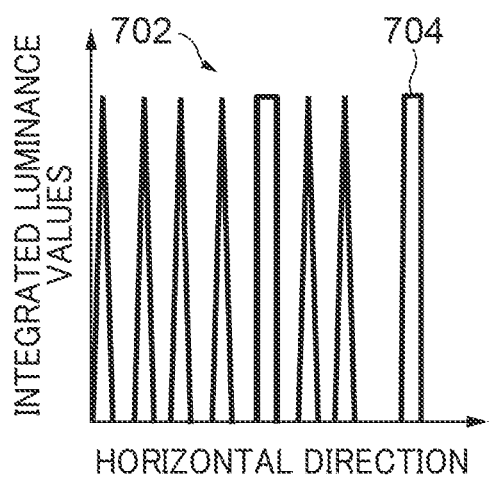
*FIG. 7A3*
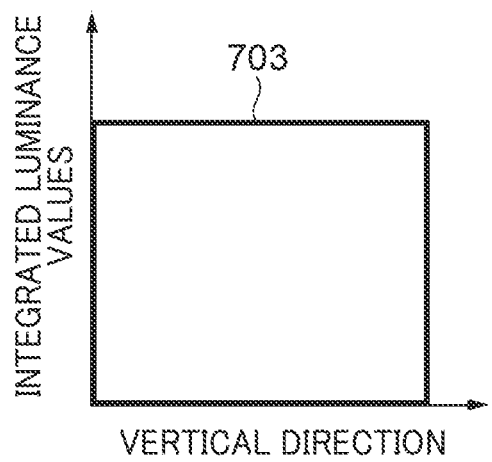

*FIG. 7B1*
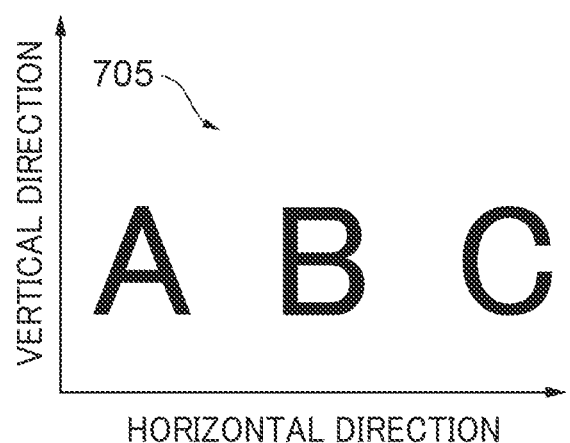
*FIG. 7B2*
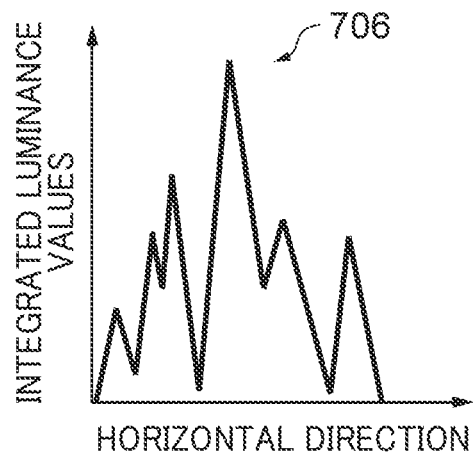
*FIG. 7B3*
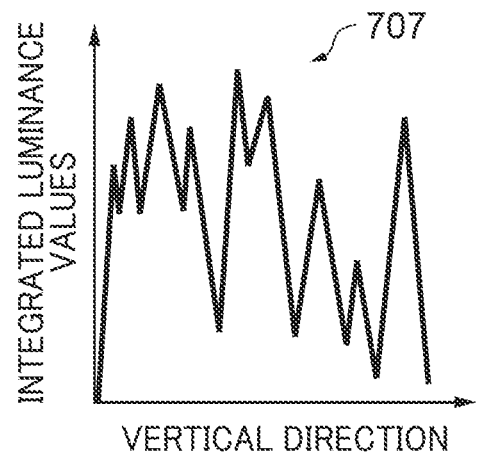

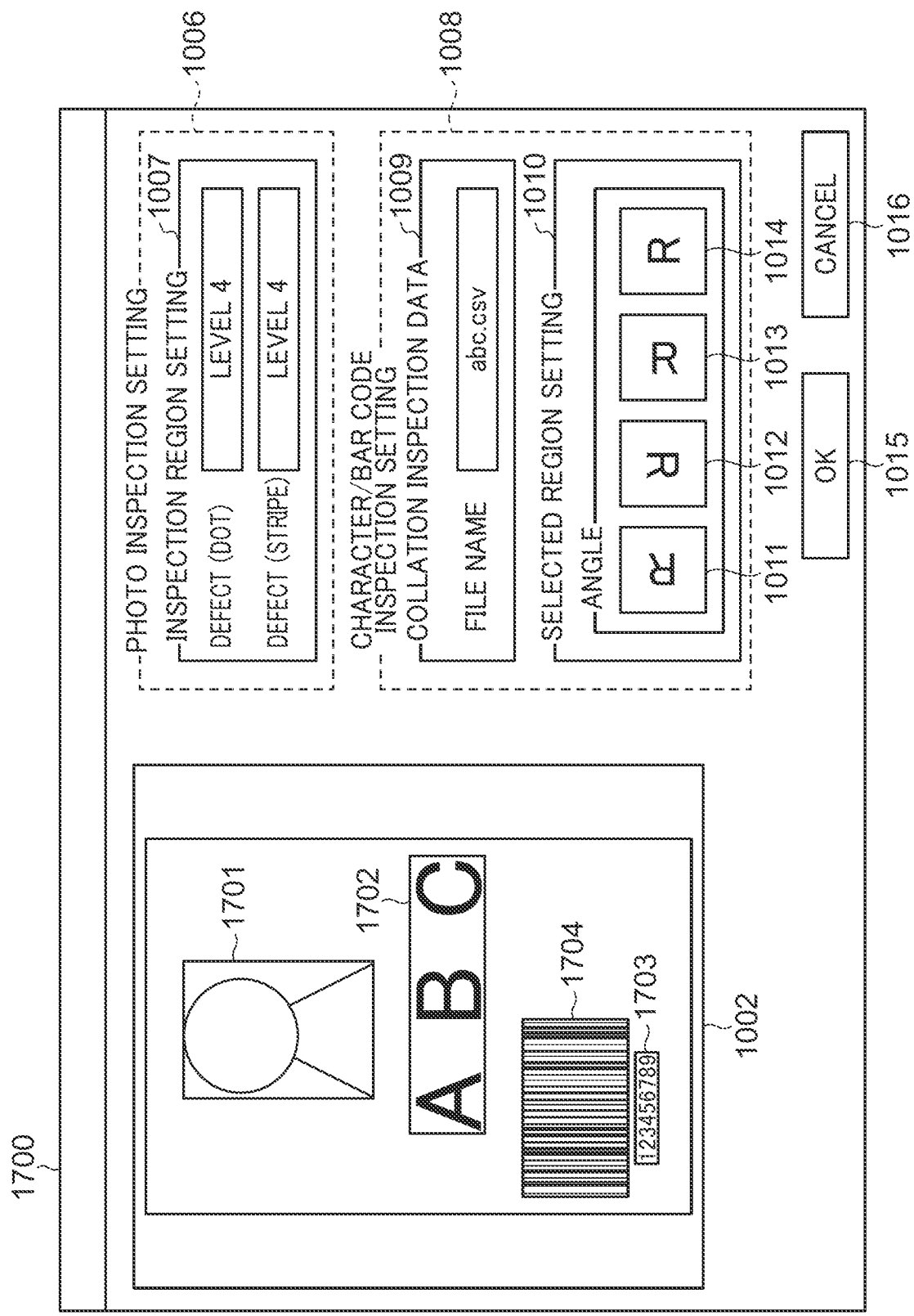

INSPECTION APPARATUS CAPABLE OF REDUCING INSPECTION WORKLOAD, METHOD OF CONTROLLING INSPECTION APPARATUS, AND STORAGE MEDIUM

BACKGROUND OF THE INVENTION

Field of the Invention

The present invention relates to an inspection apparatus that is capable of reducing inspection workload, a method of controlling the inspection apparatus, and a storage medium.

Description of the Related Art

Conventionally, inspection of a print product has been performed by manpower, but in recent years, an apparatus has come to be used which automatically performs inspection of a print product as post processing for a printer associated therewith. In such an inspection apparatus, a reference image is registered in advance. Then, input image data is printed out on a sheet by an image forming apparatus, and the data printed out on the sheet is read by a reading section included in the inspection apparatus to thereby generate a scanned image. The inspection apparatus detects a defect in the print product by comparing the scanned image and the registered reference image. The inspection for thus detecting a defect in a print product is referred to as the printed image inspection.

Further, not only the printed image inspection, but also inspection of variable area part, such as a character string and a bar code, is performed in variable printing. Examples of this inspection include character string inspection in which character recognition processing is performed with respect to a result of reading a character string, and the recognized result is collated with a correct answer (reference), and bar code inspection in which a result obtained by reading and decoding a bar code is collated with a correct answer (reference). The character string inspection and the bar code inspection are collectively referred to as the data inspection. In the data inspection, a variety of inspections are performed based on an inspection region and inspection contents, set in advance (see e.g. Japanese Laid-Open Patent Publication (Kokai) No. 2012-206461).

However, in the conventional technique, an inspection operator is required to manually set the inspection region and the inspection contents, which causes a problem that the workload of the inspection operator is increased.

SUMMARY OF THE INVENTION

The present invention provides an inspection apparatus that is capable of reducing a workload of an inspection operator, a method of controlling the inspection apparatus, and a storage medium.

In a first aspect of the present invention, there is provided an inspection apparatus that performs inspection of a print product, including at least one processor, and a memory coupled to the at least one processor, the memory having instructions that, when executed by the processor, perform the operations as a reading unit configured to read the print product and generate a scanned image of the print product, a detection unit configured to detect a line region and a photo region from the scanned image, a determination unit configured to determine the line region as one of a character region and a bar code region, an inspection setting unit configured to set settings of inspection of the print product based on a result of detection performed by the detection unit and a result of determination performed by the determination unit, and an inspection processing unit configured to perform inspection of the print product based on the settings set by the inspection setting unit.

In a second aspect of the present invention, there is provided a method of controlling an inspection apparatus that performs inspection of a print product, including reading the print product and generating a scanned image of the print product, detecting a line region and a photo region from the scanned image, determining the line region as one of a character region and a bar code region, setting settings of inspection of the print product based on a result of detection performed by said detecting and a result of determination performed by said determining, and performing the inspection of the print product based on the settings of the inspection.

According to the present invention, it is possible to reduce the workload of the inspection operator.

Further features of the present invention will become apparent from the following description of exemplary embodiments (with reference to the attached drawings).

BRIEF DESCRIPTION OF THE DRAWINGS

FIG. 5 is a flowchart of an object analysis process performed by a reference image analysis section according to an instruction provided in a step in FIG. 4.

FIGS. 6A to 6D are diagrams useful in explaining detection of a line region and a photo region in a step in FIG. 5.

FIGS. 7A1 to 7A3 and 7B1 to 7B3 are diagrams useful in explaining calculation of a projection histogram in a step in FIG. 5.

FIG. 17 is a diagram showing an example of a setting screen displayed on the UI section appearing in FIG. 3.

DESCRIPTION OF THE EMBODIMENTS

The present invention will now be described in detail below with reference to the accompanying drawings showing embodiments thereof. However, the component elements described in these embodiments are described only by way of example and are by no means intended to limit the scope of the present invention to them alone.

Figure 1:
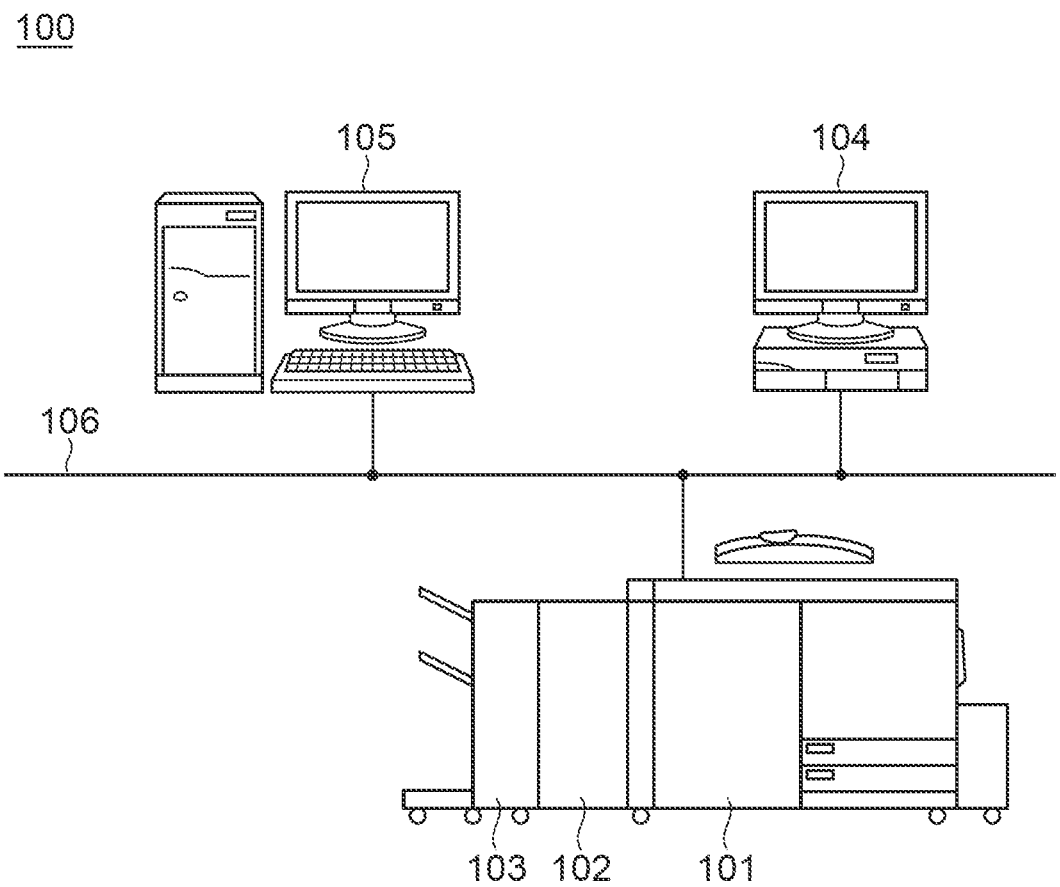
FIG. 1 is a network diagram of an inspection system including an inspection apparatus according to embodiments of the present invention.

FIG. 1 is a network diagram of an inspection system 100 including an inspection apparatus 102 according to the embodiments of the present invention.

The inspection system 100 shown in FIG. 1 includes an image forming apparatus 101, the inspection apparatus 102, a finisher 103, a client PC 104, and a print server 105. In the inspection system 100, the image forming apparatus 101 is connected to the client PC 104 and the print server 105 via a network 106. Further, the image forming apparatus 101 is connected to the inspection apparatus 102 and the finisher 103 via communication cables, not shown. The inspection apparatus 102 is connected not only to the image forming apparatus 101, but also to the finisher 103 via a communication cable, not shown. The inspection system 100 is an in-line inspection system that performs image formation, inspection of a print product, post processing, and sheet discharge in a substantially single sequence.

The image forming apparatus 101 converts image data or document data received from the client PC 104, the print server 105, or the like, to print data and outputs a print product generated by printing the print data on a sheet. The inspection apparatus 102 performs printed image inspection which is inspection for detecting a defect in a print product output from the image forming apparatus 101. The defect mentioned here is a defect which reduces the quality of a print product, and refers to stain generated by attachment of color material to unintended places, a stripe generated due to insufficient attachment of color material on an intended place, and the like. Further, the inspection apparatus 102 performs data inspection for inspecting variable area part, such as a character string and a bar code, in variable printing. Examples of the data inspection include data readability inspection for checking whether or not a character string or bar code can be read, and data collating inspection in which a result of reading a character string or bar code is collated with reference data registered in advance. The inspection apparatus 102 outputs the inspected print product to the finisher 103.

The finisher 103 performs post processing, such as bookbinding, on inspected print products received from the inspection apparatus 102 based on settings specified e.g. on the client PC 104. Further, the finisher 103 determines a discharge destination of each inspected print product, based on a result of the inspection performed by the inspection apparatus 102 and outputs the print product to the determined discharge destination.

Figure 2:
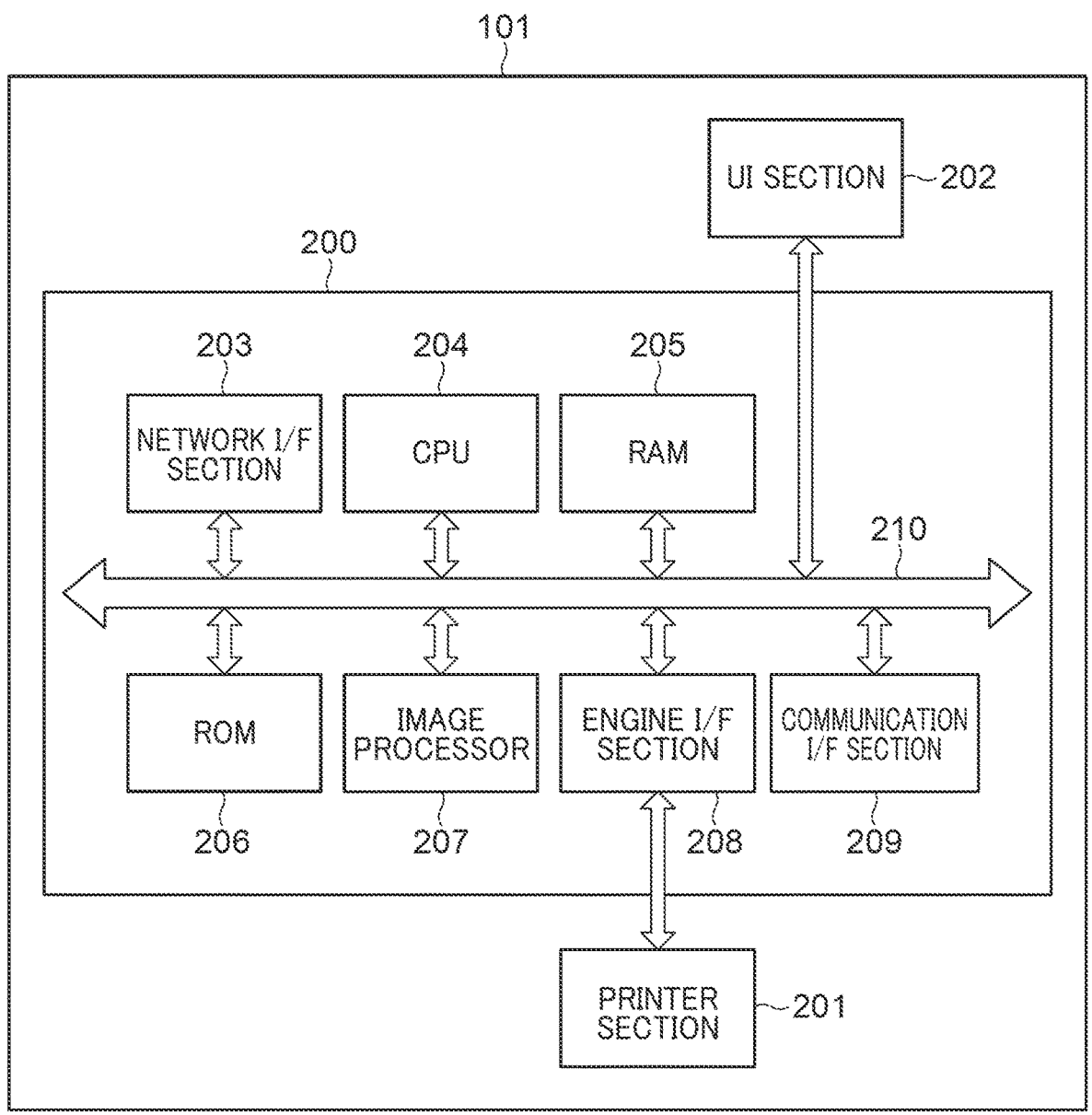
FIG. 2 is a schematic block diagram of an image forming apparatus appearing in FIG. 1.

FIG. 2 is a schematic block diagram of the image forming apparatus 101 appearing in FIG. 1. Referring to FIG. 2, the image forming apparatus 101 includes a controller unit 200, a printer section 201, and a UI section 202. The controller unit 200 is connected to the printer section 201 and the UI section 202.

The controller unit 200 converts image data or document data received from the client PC 104, the print server 105, etc., to print data. The printer section 201 print products the print data on a sheet. The UI section 202 is a console section used by a user to give an instruction for selection of sheet information and the like to the image forming apparatus 101.

Further, the controller unit 200 includes a network interface section 203, a CPU 204, a RAM 205, a ROM 206, an image processor 207, an engine interface section 208, and a communication interface section 209. The network interface section 203, the CPU 204, the RAM 205, the ROM 206, the image processor 207, the engine interface section 208, and the communication interface section 209 are interconnected via an internal bus 210.

The network interface section 203 is an interface for transmitting and receiving data to and from the client PC 104, the print server 105, and so forth. The CPU 204 controls the overall operation of the image forming apparatus 101. The RAM 205 is used as a work area when the CPU 204 executes a variety of commands. The ROM 206 stores program data executed by the CPU 204 when the image forming apparatus 101 is started up, setting data of the controller unit 200, and so forth. The image processor 207 executes image processing for converting image data or document data received from the client PC 104, the print server 105, and the like, to print data. The engine interface section 208 transmits the print data to the printer section 201. The communication interface section 209 is an interface used by the image forming apparatus 101 to communicate with the inspection apparatus 102 and the finisher 103.

In the inspection system 100, image data or document data generated by the client PC 104 or the print server 105 is transmitted to the image forming apparatus 101 as PDL data via a network, such as a local area network (LAN). The image forming apparatus 101 receives the PDL data via the network interface section 203 and stores the received PDL data in the RAM 205. Further, a print instruction input to the UI section 202 by the user is also stored in the RAM 205. The print instruction input by the user is e.g. selection of a sheet type.

The image processor 207 acquires the PDL data stored in the RAM 205 and performs image processing for converting the acquired PDL data to print data. This image processing is processing for rasterizing the PDL data to convert the PDL data to multi-valued bitmap data, and further performing screen processing and the like to thereby convert the multi-valued bitmap data to binary bitmap data. The binary bitmap data obtained by the image processor 207 is transmitted to the printer section 201 via the engine interface section 208.

The printer section 201 prints the received binary bitmap data on a sheet using color material. The CPU 204 provides an instruction to the printer section 201 based on a print instruction input by the user and stored in the RAM 205. For example, in a case where an instruction for performing printing using a coated sheet is received from the user, the CPU 204 instructs the printer section 201 to feed coated sheets from a sheet cassette, not shown, which stores the coated sheets, in the image forming apparatus 101. In the present embodiment, the above-described variety of processing operations from reception of PDL data to printing of the PDL data on a sheet are controlled by the CPU 204, whereby a full-color toner image is formed on the sheet.

Figure 3:
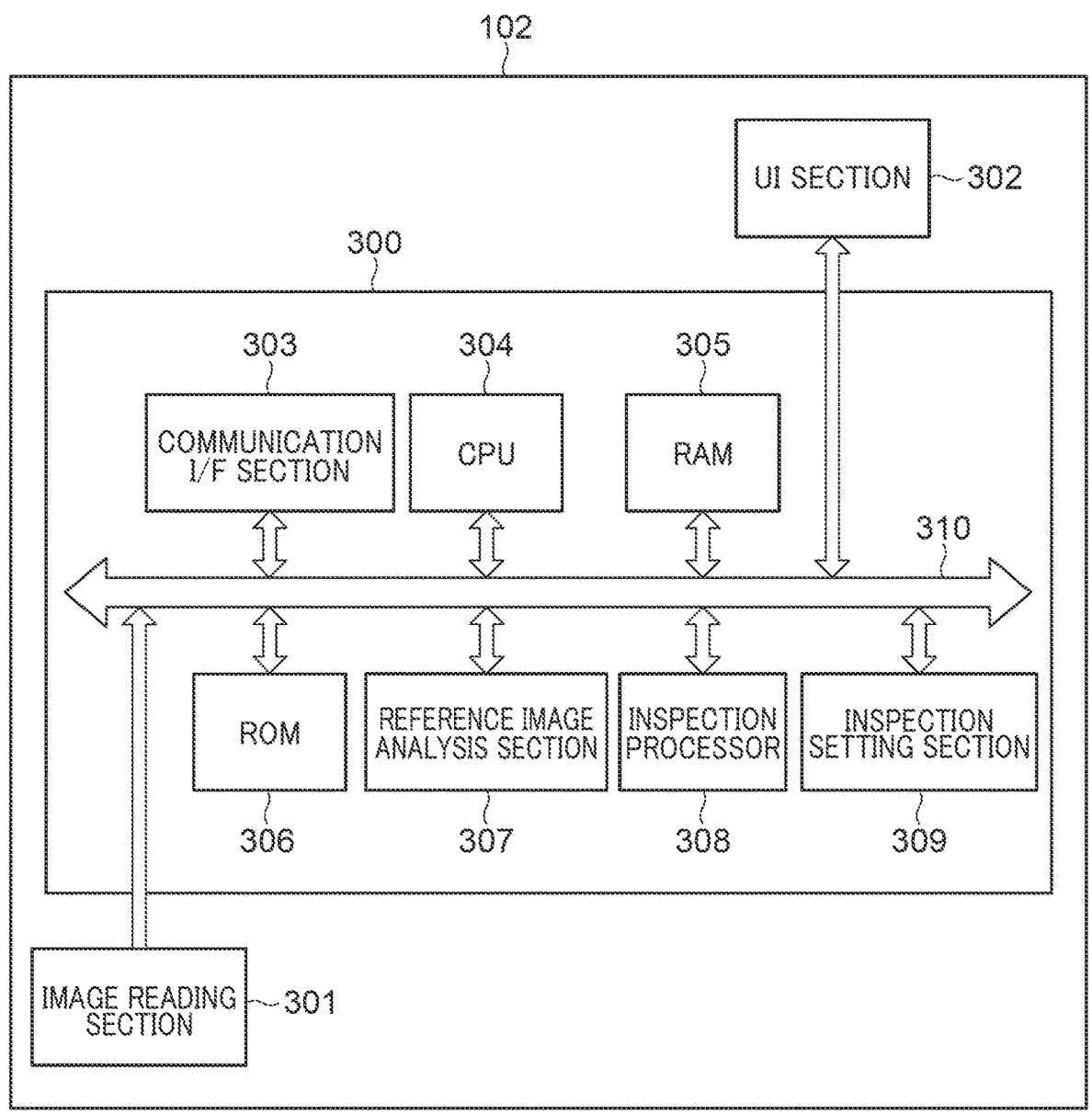
FIG. 3 is a schematic block diagram of the inspection apparatus appearing in FIG. 1.

FIG. 3 is a schematic block diagram of the inspection apparatus 102 appearing in FIG. 1. Referring to FIG. 3, the inspection apparatus 102 includes an inspection controller 300, an image reading section 301, and a UI section 302. The inspection controller 300 is connected to the image reading section 301 and the UI section 302.

The inspection controller 300 performs control of the overall operation of the inspection apparatus 102, control associated with the printed image inspection, and control associated with the data inspection. The image reading section 301 reads a print product output from the image forming apparatus 101 and generates a scanned image of the read print product. The UI section 302 is an operation section for performing configuration of settings of the inspection apparatus 102 and display of an inspection result. Here, the configuration of settings of the inspection apparatus 102 refers to setting of inspection items about each of which a defect is to be inspected when inspecting a print product. For example, the inspection items include detection of a circular-shape defect (dot) and a linear-shape defect (stripe), and determination of whether variable area part, such as a character string and a bar code, is correct or incorrect.

Further, the inspection controller 300 includes a communication interface section 303, a CPU 304, a RAM 305, a ROM 306, a reference image analysis section 307, an inspection processor 308, and an inspection setting section 309. The communication interface section 303, the CPU 304, the RAM 305, the ROM 306, the reference image analysis section 307, the inspection processor 308, and the inspection setting section 309 are interconnected via an internal bus 310.

The communication interface section 303 is an interface for communicating data with the image forming apparatus 101 and the finisher 103. The CPU 304 controls the overall operation of the inspection apparatus 102. The RAM 305 is used as a work area when the CPU 304 executes a variety of commands. The ROM 306 stores program data executed by the CPU 304 when the inspection apparatus 102 is started up, setting data of the inspection controller 300, and so forth. The reference image analysis section 307 performs object analysis processing of a reference image, referred to hereinafter. The inspection processor 308 performs detection of a defect in a print product and determination of whether a character string or a bar code is correct/incorrect. The inspection setting section 309 sets settings of inspection regions, referred to hereinafter.

Next, the outline of the inspection performed by the inspection apparatus 102 will be described.

The inspection apparatus 102 causes the image reading section 301 to read a print product output as an inspection target from the image forming apparatus 101 and generates a scanned image of the print product (hereinafter referred to as the "inspection target scanned image"). The acquired inspection target scanned image is stored in the RAM 305. Then, the inspection apparatus 102 causes the inspection processor 308 to calculate difference values between a reference image stored in the RAM 305 in advance as a reference image and the inspection target scanned image. Then, the inspection apparatus 102 performs inspection by comparing each calculated difference value and an inspection threshold value of each inspection item (contrast and size) for each pixel. As a result of the inspection, for example, information indicating whether or not the print product has a defect, a type of a detected defect (dot or stripe), position information of the defect for displaying the inspection result on the UI section 302, information on determination of whether a character string and a bar code is correct or incorrect, and so forth are stored in the RAM 305.

Then, the inspection apparatus 102 displays the inspection result stored in the RAM 305 on the UI section 302. The inspection operator can recognize the inspection result from the information displayed on the UI section 302. In a case where a predetermined number of print products each having a defect are continuously generated, the inspection apparatus 102 transmits continuous defect generation information indicating this fact to the image forming apparatus 101. Further, the inspection apparatus 102 transmits defect presence/absence information indicating whether or not a print has a defect to the finisher 103.

The CPU 204 of the image forming apparatus 101 having received the continuous defect generation information from the inspection apparatus 102 instructs the printer section 201 to stop printing. With this, in the image forming apparatus 101, the print operation is stopped.

On the other hand, the finisher 103 having received the defect presence/absence information from the inspection apparatus 102 discharges a print product having no defect to a normal discharge tray and discharges a print product having a defect to a tray different from the normal discharge tray using the received defect presence/absence information.

Figure 4:
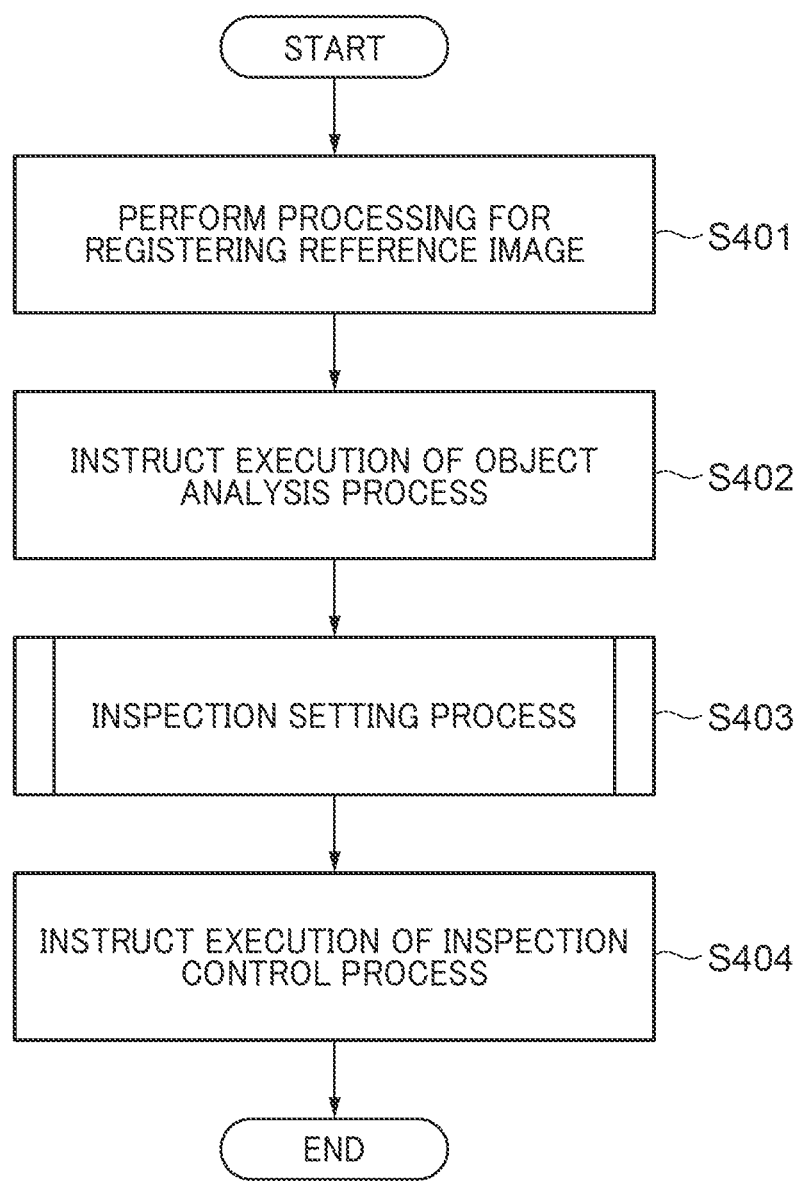
FIG. 4 is a flowchart of the whole process of inspection performed by the inspection apparatus appearing in FIG. 1 from registration work before starting inspection to execution of the inspection.

FIG. 4 is a flowchart of the whole process of inspection performed by the inspection apparatus 102 appearing in FIG. 1 from registration work before starting the inspection to execution of the inspection. Steps in FIG. 4 are realized by the CPU 304 that executes an associated program stored in the ROM 306.

Referring to FIG. 4, first, in a step S401, the CPU 304 performs processing for registering a reference image used as a reference of the inspection. In this registration processing, the CPU 304 displays a scanned image prepared by the inspection operator on the UI section 302. This scanned image is generated by the image forming apparatus 101 that reads a print product visually determined to have no defect by the inspection operator. When the inspection operator presses a registration button, not shown, on the UI section 302 in a state in which the scanned image is displayed, the CPU 304 stores the scanned image in the RAM 305 as the reference image. With this, the scanned image is registered as the reference image.

Then, in a step S402, the CPU 304 instructs the reference image analysis section 307 to execute an object analysis process, described hereinafter with reference to FIG. 5. With this process, determination of types of objects forming the reference image and detection of regions are performed.

Then, in a step S403, the CPU 304 executes an inspection setting process, described hereinafter with reference to FIG. 8, and automatically sets the inspection regions and inspection types. With this process, preparation before starting the inspection is completed, and the inspection apparatus 102 is enabled to execute the inspection of a print product based on the settings set in the step S403.

After that, the image forming apparatus 101 outputs a print product to be inspected according to an instruction received from the inspection operator. This print product is conveyed to the inspection apparatus 102, and when the inspection operator presses an inspection start button (not shown) displayed on the UI section 302, the CPU 304 causes the reading section 301 to read this print product and generate a scanned image of the print product (inspection target scanned image). The inspection target scanned image is stored in the RAM 305 of the inspection apparatus 102. Then, in a step S404, the CPU 304 instructs the inspection processor 308 to execute an inspection control process, described hereinafter with reference to FIG. 11. With this, the inspection for comparing the stored inspection target scanned image with the reference image is performed. Thus, the inspection system 100 performs the inspection of the print product.

FIG. 5 is a flowchart of the object analysis process performed by the reference image analysis section 307 according to the instruction provided in the step S402 in FIG. 4.

First, in a step S501, the reference image analysis section 307 detects a line region and a photo region from the reference image. The method of detecting a line region and a photo region will be described with reference to FIGS. 6A to 6D. Note that although in the present embodiment, a case where the reference image is a 24-bit image having 8 bits of RGB will be described by way of example, the reference image is not limited to this, but for example, a YUV image defined by luminance and chrominance difference values may be used.

Figure 6A:
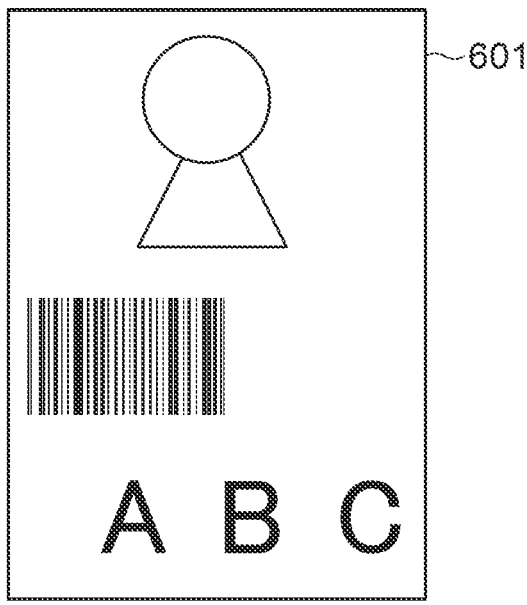

In the step S501, first, the reference image analysis section 307 generates a binary image from the reference image. In the binary image, a pixel in the input image, which is darker than a threshold value, is a black pixel, and a pixel in the same, which is not darker than the threshold value, is a white pixel. Note that the binarization result may be expressed not by black and white, but by other colors, and further, may be expressed by "1" and "0" or "0" and "1" without using colors. Here, a binary image 601 in FIG. 6A is described as an example of the binary image of the reference image. Note that in a case where the input image is a color multi-valued image, binarization is performed only with respect to the luminance (such as Y out of YUV) of the multi-valued image. In calculating the threshold value for binarization, a known technique is used. For example, the threshold value may be calculated from a histogram of the luminance of the whole image, or a desired value may be set as the threshold value.

Further, the reference image analysis section 307 detects a photo region and a line region with respect to the binary image 601 of the reference image using the following procedure (i) to (iv):

(i) The reference image analysis section 307 extracts a block of black pixels (black pixel block) by tracking the outline of black pixels on the binary image 601. In tracking the outline, the reference image analysis section 307 determines in which direction of the eight directions of upper left, left, lower left, lower, lower right, right, upper right, and upper directions, black pixels continue. For example, as illustrated in (1) in FIG. 6B, a black pixel block 602 surrounded by broken lines is extracted.

(ii) If there is a black pixel block larger than a predetermined size set in advance in one or more extracted black pixel blocks, the reference image analysis section 307 identifies whether or not there is a white pixel block within the area of the black pixel block. More specifically, the reference image analysis section 307 extracts a white pixel block by tracking the outline of white pixels within the area of the black pixel block. For example, as illustrated in (2) in FIG. 6B, the reference image analysis section 307 tracks the outline of white pixels inside the black pixel block 602 and extracts a white pixel block 603. Further, if the extracted white pixel block is larger than a predetermined size set in advance, the reference image analysis section 307 extracts a black pixel block by tracking the outline of black pixels within the white pixel block again. These processing operations are repeatedly performed until the pixel block becomes not larger than the predetermined size. This process is performed so as to extract a line region in an area surrounded by e.g. a frame line.

(iii) The reference image analysis section 307 classifies each obtained black pixel block into one of a line image and a photo using at least one of the size, the shape, and the black pixel density. For example, as indicated by a character in (3) in FIG. 6B, in a case where the density of the black pixels in the black pixel block is high, this black pixel block is determined as a black pixel block forming a line image. Then, the other black pixel blocks are determined as pixel blocks forming a photo. Although the character of "A" is determined here as a line image, a character of "B" and a character of "C" are also similarly determined as the line images by performing the process from (i) to (iii).

(iv) In a case where a distance between end portions of black pixel blocks each forming a line image is close, the reference image analysis section 307 classifies the black pixel blocks into the same group. After this classification, a circumscribed rectangle area including all of the black pixel blocks classified into the same group is determined as a line region. For example, as illustrated in (4) in FIG. 6B, in a case where the distances between line images are close, the reference image analysis section 307 determines these line images as one line region. Note that in a case where one black pixel block forms a line image, and there is no other black pixel block forming the line image within a predetermined distance from the one black pixel block, the one black pixel block singly forms one group. Therefore, the circumscribed rectangle area of the single black pixel block is determined as a line region. Note that the same processing as described in (iv) is performed also with respect to black pixel blocks forming photos. Then, the reference image analysis section 307 outputs the position information of each region and the attribute determination information of the region as a determination result. The attribute determination information is information indicating whether each region is a line region or a photo region.

Figure 6C:
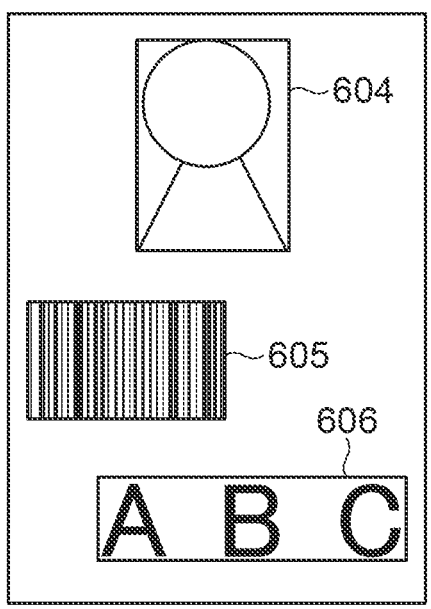
Figure 6B:
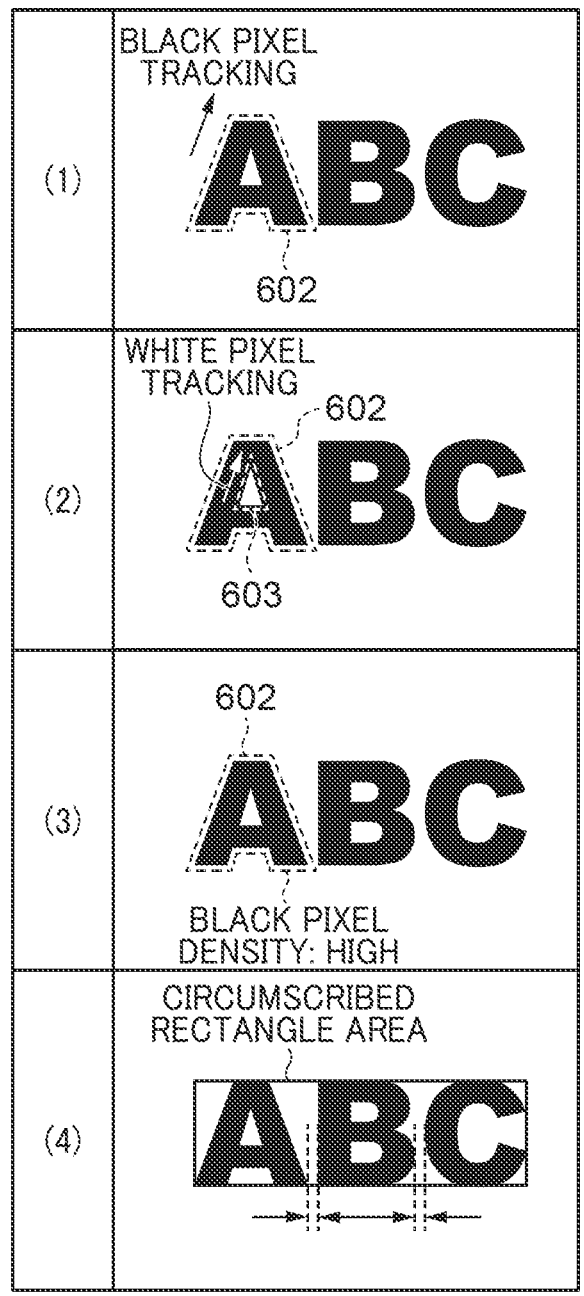

As a result of the above-described process of (i) to (iv), for example, a region 604 in FIG. 6C is determined as a photo region, and a region 605 and a region 606 are determined as line regions. Thus, in the step S501, the line regions and the photo region are detected from the reference image.

Then, in a step S502, the reference image analysis section 307 determines whether or not one or more line regions have been detected in the step S501. If it is determined in the step S502 that one or more line regions have been detected in the step S501, the object analysis process proceeds to a step S503. If it is determined in the step S502 that no line region has been detected in the step S501, the object analysis process is terminated, and the process proceeds to the step S403 in FIG. 4.

In the step S503, the reference image analysis section 307 selects one line region out of the line regions detected in the step S501. In the present embodiment, it is assumed that the line regions detected in the step S501 are selected in the order of raster scan. For example, in FIG. 6C, the line region 605 is selected first. Note that the selection method is not limited to this, but the line regions may be selected in any other order.

Then, in a step S504, the reference image analysis section 307 calculates a projection histogram in each of a horizontal direction and a vertical direction with respect to the pixels in the selected line region. The method of calculating the projection histogram will be described with reference to FIGS. 7A1 to 7A3 and 7B1 to 7B3.

Reference numeral 701 in FIG. 7A1 denotes a pixel group in the line region 605 selected in the step S503. Reference numeral 702 in FIG. 7A2 denotes a graph obtained as a result of integrating luminance values in the horizontal direction with respect to this pixel group 701 in FIG. 7A1, and reference numeral 703 in FIG. 7A3 denotes a graph obtained as a result of integrating luminance values in the vertical direction with respect to the same pixel group. The luminance value is calculated e.g. using average values of the respective signal values of RGB. For example, in a case where the pixel group 701 is a pixel group having 50 pixels in the vertical direction and 100 pixels in the horizontal direction, the integrated value of the luminance values of the pixel group on the rightmost column is indicated by reference numeral 704. In a case where the luminance values of the pixel group on the rightmost column are all 255, the integrated value is calculated by 255×50=12750. Since 100 pixels are arranged in the horizontal direction in the pixel group 701, 100 integrated value are thus calculated. Similarly, with respect to the vertical direction as well, 50 integrated values are calculated.

Then, the reference image analysis section 307 calculates the dispersion of each of the respective histograms in the horizontal direction and the vertical direction, for each line region. In the present embodiment, as the dispersion of the histogram, there is used a value calculated by dividing the sum of squares of differences between each of the respective average values of integrated values in the vertical direction and the horizontal direction and each associated one of the integrated values by the number of the integrated values. However, this is not limitative, but for example, standard deviation using not the sum of squares, but using the simple sum may be calculated and used. Then, the reference image analysis section 307 calculates the absolute value of a difference between the calculated dispersion value of the histogram in the horizontal direction and the calculated dispersion value of the histogram in the vertical direction.

Then, in a step S505, the reference image analysis section 307 determines whether or not this value is equal to or larger than a threshold value. For example, the pixel group 701 in FIG. 7A1 is a pixel group of a region of the reference image, where a bar code is printed, and the pixel group of this type is high in dispersion in the horizontal direction and low in the vertical direction. For example, it is assumed that a dispersion value in the horizontal direction is "250", and a dispersion value in the vertical direction is "10". Here, to prevent the influence of the magnitude of the luminance value, for example, these values are normalized before calculation of the difference therebetween by dividing each of them by an assumable maximum value of the luminance value of the reference image, e.g. "255". As a result, the dispersion value in the horizontal direction is normalized to "0.98" and the dispersion value in the vertical direction is normalized to "0.04", so that the difference between these values is "0.94". In a case where the threshold value is set to e.g. "0.5", the calculated difference exceeds the threshold value. Thus, in a case where the absolute value of the difference between the dispersion in the horizontal direction and the dispersion in the vertical direction is equal to or larger than the threshold value, the object analysis process proceeds to a step S506.

Reference numeral 705 in FIG. 7B1 denotes a pixel group in the line region 606 selected in the step S503. Reference numeral 706 in FIG. 7B2A denotes a graph obtained as a result of integrating luminance values in the horizontal direction with respect to this pixel group, and reference numeral 707 in FIG. 7B3 denotes a graph obtained as a result of integrating luminance values in the vertical direction with respect to this pixel group. The pixel group 705 in FIG. 7B1 is a pixel group of a region of the reference image, where a character string (ABC) is printed, and the pixel group of this type is high in dispersion in both of the horizontal direction and the vertical direction. For example, let it be assumed that a dispersion value in the horizontal direction is "200" and a dispersion value in the vertical direction is "170". When these values are normalized in the manner described above, the dispersion value in the horizontal direction is normalized to "0.78" and the dispersion value in the vertical direction is normalized to "0.67", so that the difference between these values is "0.11". This difference is smaller than "0.5" which is the threshold value. Thus, in a case where the absolute value of the difference between the dispersion in the horizontal direction and the dispersion in the vertical direction is smaller than the threshold value, the object analysis process proceeds to a step S507. Note that although in the present embodiment, the above-described determination is performed based on the difference in dispersion, this is not limitative, but for example, the above-described determination may be performed based on a difference in standard deviation.

In the step S506, the reference image analysis section 307 determines the line region selected in the step S503 as a bar code region. Then, the object analysis process proceeds to a step S508.

In the step S507, the reference image analysis section 307 determines the line region selected in the step S503 as a character region. Then, the object analysis process proceeds to the step S508.

In the step S508, the reference image analysis section 307 determines whether or not all of the line regions in the reference image have been selected. If all of the line regions in the reference image have been selected, the object analysis process is terminated, and the process proceeds to the step S403 in FIG. 4. If there is a line region having not been selected from the reference image, the object analysis process returns to the step S503.

Note that information associated with each region which has been detected and determined by the above-described object analysis process (hereinafter referred to as the "object information") is recorded in a list 607 shown in FIG. 6D, and the list 607 is stored in the RAM 305. The object information includes attribute information of a region detected by the object analysis process, and coordinate information of an upper left corner and a lower right corner of the region. Note that the coordinate system of an image has an origin (0,0) at the center of a pixel at an upper left corner of the image, and the x coordinate increases positively in the right direction and the y coordinate increases positively in the downward direction. The attribute information is information indicating one of a photo, a bar code, and a character. In the list 607, a plurality of items of object information which are associated with the region 604, the region 605, and the region 606 in FIG. 6C, respectively, are recorded, with an ID assigned to each item of object information. In the list 607, an ID of "0" is assigned to an item of object information, which is associated with the region 604, an ID of "1" is assigned to an item of object information, which is associated with the region 605, and an ID of "2" is assigned to an item of object information, which is associated with the region 606. For example, the IDs are given e.g. in the order of the sum of values of the x coordinate and the y coordinate of the upper left corner of the region, from the smallest.

Figure 8:
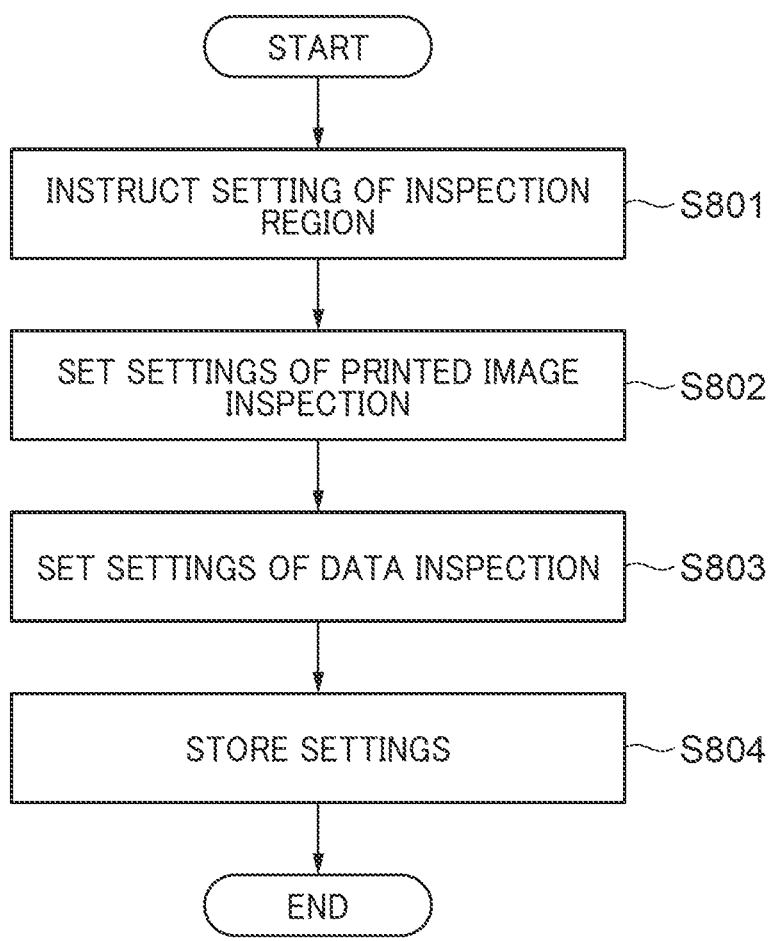
FIG. 8 is a flowchart of an inspection setting process executed in a step in FIG. 4.

FIG. 8 is a flowchart of the inspection setting process in the step S403 in FIG. 4.

Referring to FIG. 8, first, in a step S801, the CPU 304 instructs the inspection setting section 309 to set settings of inspection regions. The inspection setting section 309 having received this instruction performs an inspection region-setting process in FIG. 9.

Figure 9:
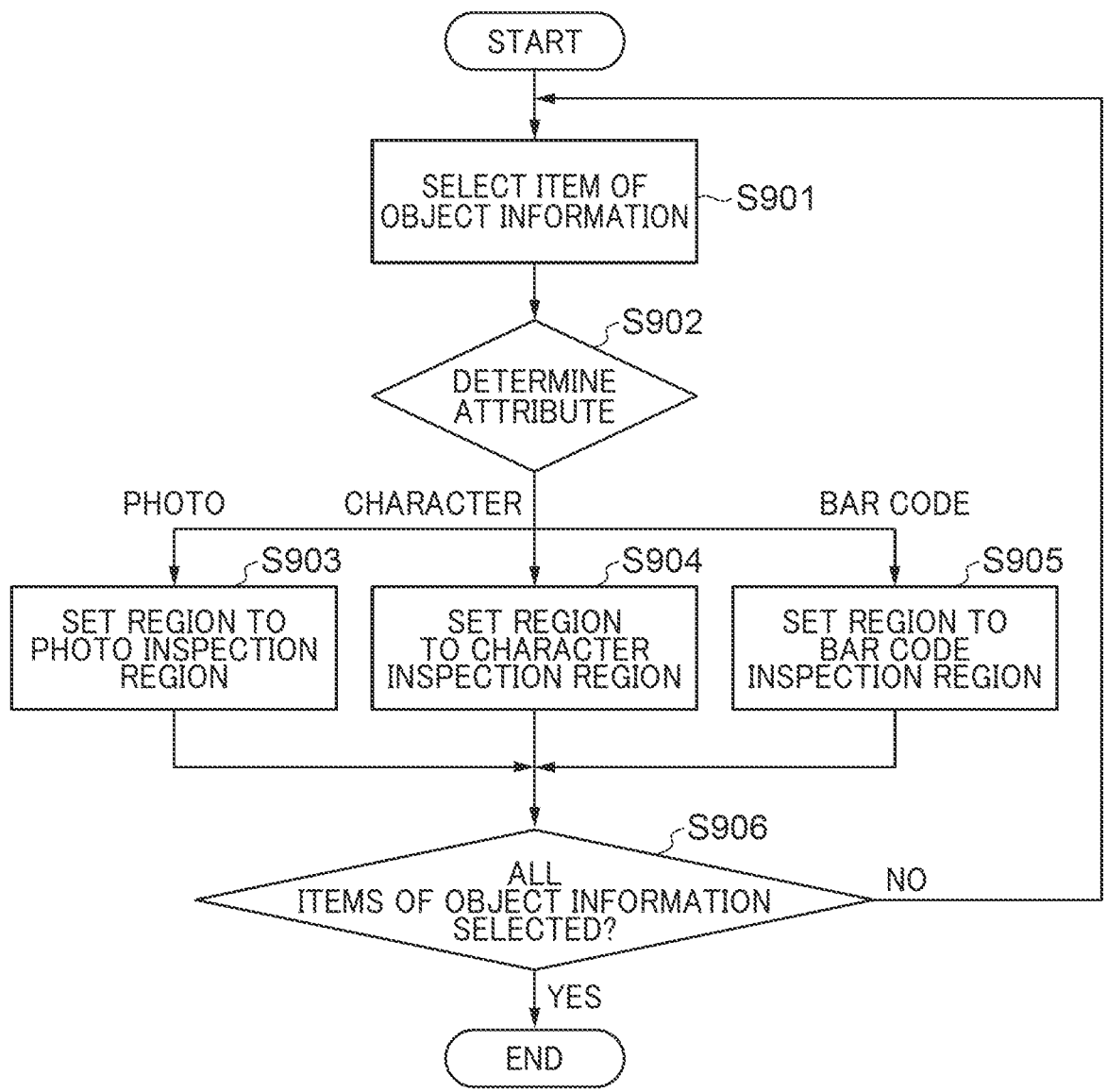
FIG. 9 is a flowchart of an inspection region-setting process performed by an inspection setting section according to an instruction provided in a step in FIG. 8.

FIG. 9 is a flowchart of the inspection region-setting process performed by the inspection setting section 309 according to the instruction provided in the step S801 in FIG. 8.

Referring to FIG. 9, first, in a step S901, the inspection setting section 309 selects one item of object information from the list 607 stored in the RAM 305. Note that the inspection setting section 309 selects the items of object information in the order of IDs from the smallest. Note that the order of selecting the items of object information is not limited to this order, and the items of object information may be selected in another order.

Then, in a step S902, the inspection setting section 309 determines, based on the selected object information, the attribute of a region associated with the selected item of object information. Note that the above-mentioned region is a region indicated by an associated item of coordinate information of the reference image, which is included in the item of object information selected in the step S901. If it is determined in the step S902 that the attribute of the region is a photo, the inspection region-setting process proceeds to a step S903. If it is determined in the step S902 that the attribute of the region is a character, the inspection region-setting process proceeds to a step S904. If it is determined in the step S902 that the attribute of the region is a bar code, the inspection region-setting process proceeds to a step S905.

In the step S903, the inspection setting section 309 sets the above-mentioned region to a photo inspection region. Then, the inspection region-setting process proceeds to a step S906. In the step S904, the inspection setting section 309 sets the above-mentioned region to a character inspection region.

Then, the inspection region-setting process proceeds to the step S906. In the step S905, the inspection setting section 309 sets the above-mentioned region to a bar code inspection region. Then, the inspection region-setting process proceeds to the step S906.

Figure 10:
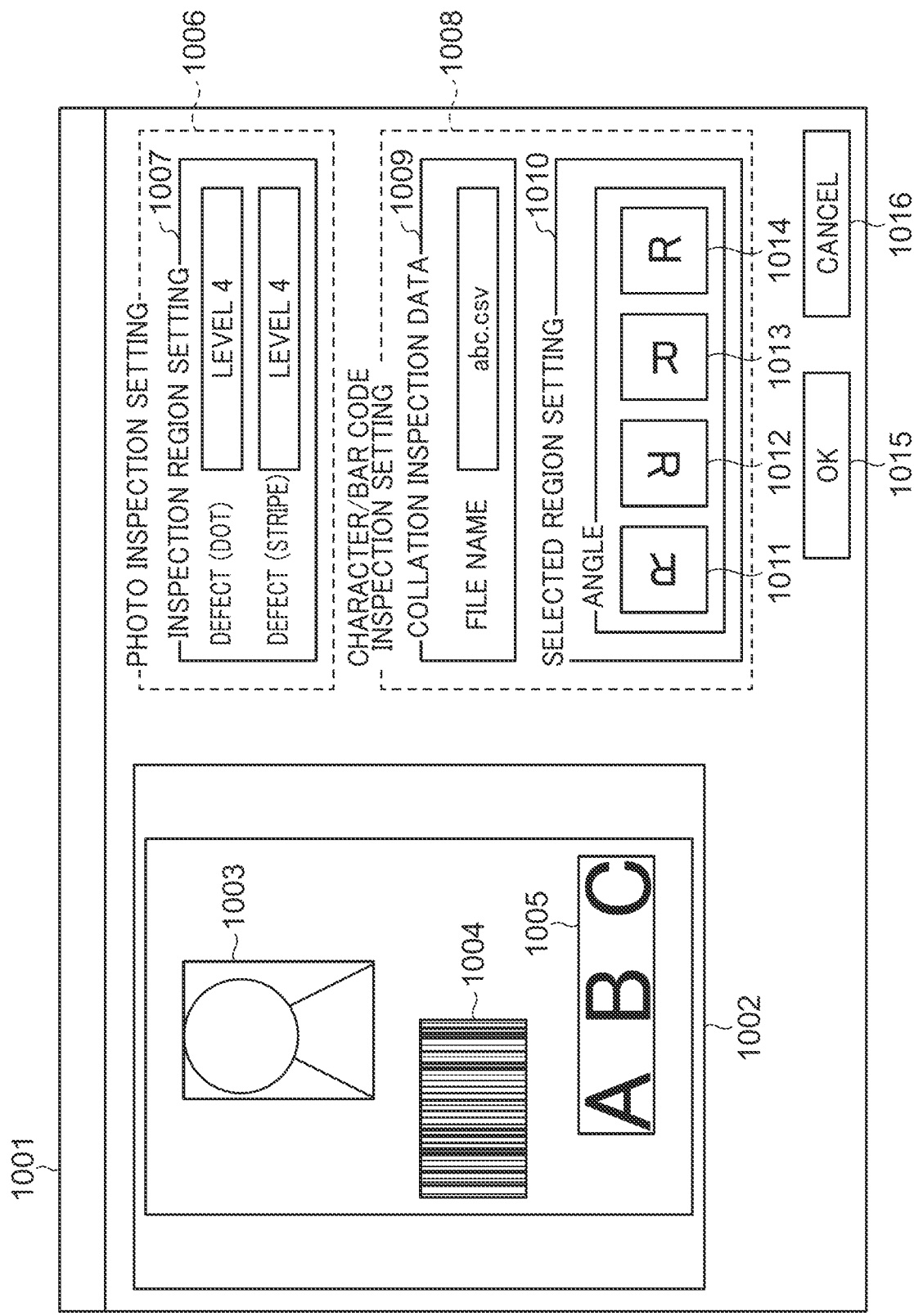
FIG. 10 is a diagram showing an example of a setting screen displayed on an UI section appearing in FIG. 3.

In the step S906, the inspection setting section 309 determines whether or not all items of the object information have been selected from the list 607. If it is determined in the step S906 that there is an item of object information which has not been selected from the list 607, the inspection region-setting process returns to the step S901, and the inspection setting section 309 selects the next item of object information from the list 607. If it is determined in the step S906 that all items of the object information have been selected from the list 607, the inspection region-setting process is terminated, and a setting screen 1001 shown in FIG. 10 is displayed on the UI section 302 of the inspection apparatus 102.

The setting screen 1001 is for a user to perform a variety of settings associated with the inspection of a print product. The setting screen 1001 is formed by an image display area 1002, a photo inspection-setting area 1006, a character/bar code inspection-setting area 1008, an OK button 1015, and a cancel button 1016.

In the image display area 1002, the reference image is displayed. A region 1003 of the reference image is a region set to the photo inspection region in the step S903. A region 1004 of the reference image is a region set to the bar code inspection region in the step S905. A region 1005 of the reference image is a region set to the character inspection region in the step S904. For example, in a case where the inspection operator selects the region 1003 in the image display area 1002, the photo inspection-setting area 1006 for setting the settings of the photo inspection is made operable. Further, in a case where the inspection operator selects the region 1004 or the region 1005 in the image display area 1002, the character/bar code inspection-setting area 1008 for setting the settings of the data inspection, i.e. the character inspection and the bar code inspection is made operable. Thus, in the present embodiment, the inspection region and the inspection type of the inspection region are set based on the object information recorded in the above-described object analysis process without requiring the inspection operator to manually set the settings.

The photo inspection-setting area 1006 includes a setting item 1007. In the setting item 1007, a degree of fineness of a defect to be detected is set for each shape of the defect. For example, the inspection level is set to each of a circular-shape defect (dot) and a linear-shape defect (stripe). The inspection level has five stages from level 1 to level 5, and the inspection at level 5 can detect a defect which is thinner and smaller in size than in the inspection at level 1. Note that in the setting item 1007, a different level can be set for each shape of the defect, for example, such that level 5 is set to the defect (dot) and level 4 is set to the defect (stripe).

The character/bar code inspection-setting area 1008 is formed by a setting item 1009 and a setting item 1010. In the setting item 1009, data of collation inspection is selected by a file selection method. FIG. 10 shows a state in which "abc.csv" is selected by the user as the data of the collation inspection by way of example. The data of the collation inspection is a reference CSV file for the data inspection, which is to be collated when the data inspection is performed. The reference CSV file is a file prepared by the user in advance, in which correct answer (reference) character strings for the character string inspection and the bar code inspection are listed. In the data inspection, a result of reading a character string or bar code is collated with the correct answer (reference) character strings listed in the reference CSV file. The setting item 1010 includes direction setting buttons 1011 to 1014 indicating an erecting direction (angle) of a character/bar code. Note that in the present embodiment, the photo inspection-setting area 1006 and the character/bar code inspection-setting area 1008 may be displayed in a state in which default values registered in advance have been entered as initial values before a user enters values.

Referring again to FIG. 8, in a step S802, the CPU 304 sets settings of the printed image inspection based on the settings set by the user on the setting screen 1001. For example, in a case where the user selects the photo inspection region 1003 and sets the respective inspection levels of the defect (dot) and the defect (stripe) in the setting item 1007 on the setting screen 1001, these settings are set in the step S802.

Then, in a step S803, the CPU 304 sets settings of the data inspection based on the settings set by the user on the setting screen 1001. For example, in a case where the user selects the bar code inspection region 1004 and the character inspection region 1005, selects a file in the setting item 1009, and further selects one of the direction setting buttons in the setting item 1010, these settings are set in the step S803. Note that the processing operations in the steps S802 and S803 may be executed in no-particular order.

Then, in a step S804, the CPU 304 stores the settings set in the steps S802 and S803 in the RAM 305. Then, the inspection setting process is terminated. With this, the inspection apparatus 102 is enabled to perform the inspection based on the settings set on the setting screen 1001 with respect to a print product output as an inspection target from the image forming apparatus 101.

Figure 11:
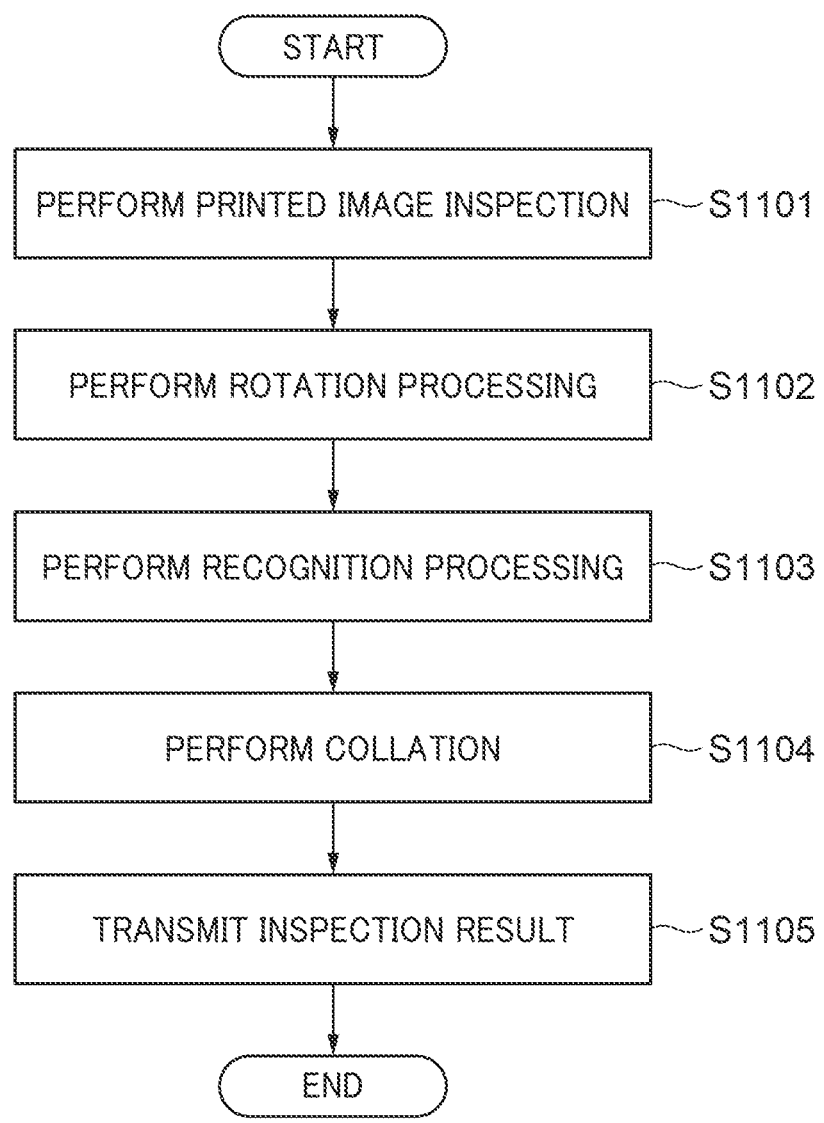
FIG. 11 is a flowchart of an inspection control process performed by an inspection processor according to an instruction provided in a step in FIG. 4.

FIG. 11 is a flowchart of the inspection control process performed by the inspection processor 308 according to the instruction provided in the step S404 in FIG. 4. The inspection control process in FIG. 11 is executed when the image reading section 301 reads a print product output as an inspection target from the image forming apparatus 101 to generate a scanned image of this print product (inspection target scanned image), and this inspection target scanned image is stored in the RAM 305.

Referring to FIG. 11, first, in a step S1101, the inspection processor 308 performs the printed image inspection based on the settings of the printed image inspection, which have been set in the step S802. More specifically, the inspection processor 308 identifies an area having the same position coordinates in the inspection target scanned image as those of the photo inspection region of the reference image as the photo inspection region of the inspection target scanned image. The inspection processor 308 detects a dot defect and a stripe defect in the photo inspection region of the inspection target scanned image.

Then, in a step S1102, the inspection processor 308 performs rotation processing based on the settings of data inspection set in the step S803. More specifically, the inspection processor 308 identifies an area having the same position coordinates in the inspection target scanned image as those of the bar code inspection region of the reference image, as the bar code inspection region of the inspection target scanned image. Further, the inspection processor 308 identifies an area having the same position coordinates in the inspection target scanned image as those of the character inspection region of the reference image as the character inspection region of the inspection target scanned image. The inspection processor 308 rotates the bar code inspection region and the character inspection region of the inspection target scanned image based on an orientation (angle) of the direction setting button selected by the user in the step S803.

Then, in a step S1103, the inspection processor 308 performs recognition processing with respect to each region rotated in the step S1102. More specifically, the inspection processor 308 performs bar code recognition with respect to the bar code inspection region of the inspection target scanned image rotated in the step S1102. Further, the inspection processor 308 performs character extraction and character recognition with respect to the character inspection region of the inspection target scanned image rotated in the step S1102.

Then, in a step S1104, the inspection processor 308 collates the character recognition result and the bar code recognition result obtained in the step S1103 with the correct answer (reference) character strings listed in the reference CSV file. The inspection processor 308 outputs a result of correct/incorrect determination as an inspection result. Then, in a step S1105, the inspection processor 308 transmits the inspection result obtained in the step S1104. In the step S1105, the inspection result is transmitted to the UI section 302. The UI section 302 having received the inspection result displays the received inspection result and the inspection target scanned image. For example, in a case where the print has a defect, the UI section 302 displays the detected defect by highlighting the same with a dotted line frame or a color frame or the like, together with the type of the detected defect (dot or stripe), the position information, and so forth. On the other hand, in a case where the print has no defect, the UI section 302 displays a message that the print has no defect. Note that the method of displaying the inspection result by the UI section 302 is not limited to the above-mentioned method, but any other method may be used insofar as the user can easily recognize the detection result.

Further, in the step S1105, as the inspection result, for example, the continuous defect generation information is transmitted to the image forming apparatus 101. The image forming apparatus 101 having received the continuous defect generation information stops the print operation.

Further, in the step S1105, as the inspection result, for example, the defect presence/absence information is transmitted to the finisher 103. The finisher 103 having received the defect presence/absence information discharges a print product having no defect to the normal discharge tray and discharges a print product having a defect to the tray different from the normal discharge tray using the defect presence/absence information. When the step S1105 is completed, the inspection control process is terminated.

According to the above-described embodiment, a line region and a photo region are detected from a scanned image, the line region is determined as one of a character region and a bar code region, and the settings associated with the inspection of the print product are set based on results of the detection and results of the determination result. With this, it is possible to reduce the time and effort of the inspection operator to set the settings associated with the inspection of a print product, so that it is possible to reduce the workload of the inspection operator.

Further, in the above-described embodiment, the line region is determined as one of the character region and the bar code region based on distribution information of luminance values in the line region. This makes it possible to determine the line region as one of the character region and the bar code region based on the information which can be acquired from the scanned image without increasing the time and effort of the inspection operator.

Further, in the above-described embodiment, the inspection of a print product includes the printed image inspection which is inspection for detecting a defect in a print product. This makes it possible to reduce the time and effort for setting the settings of the printed image inspection.

In the above-described embodiment, the inspection of a print product includes data inspection including inspection on whether a character string and a bar code on a print are readable, and inspection in which a result of reading a character string and a bar code on a print product is collated with reference data registered in advance. This makes it possible to reduce the time and effort for setting the settings of the data inspection.

In the above-described embodiment, the settings of the inspection of a print product include settings of inspection regions (regions to be inspected) on a scanned image. This makes it possible to reduce the time and effort for setting the settings of the inspection regions.

In the above-described embodiment, the settings of the inspection of a print product include a setting of the inspection type for each inspection region on a scanned image. This makes it possible to reduce the time and effort for setting the setting of the inspection type for each inspection region.

In the above-described embodiment, the settings of the inspection of a print product includes a setting of the erecting direction of the bar code inspection region. This makes it possible to reduce the time and effort for setting the setting of the erecting direction of the bar code inspection region.

Although the description has been given of the present invention using the above-described embodiment, the present invention is not limited to the above-described embodiment. For example, one of four sides forming a bar code region, which is closest to a character region, may be identified, and the erecting direction of the bar code inspection region may be set based on the result of the identification.

Next, a second embodiment of the present invention will be described. In the above-described embodiment, the settings of data inspection are set in the step S803, and in setting the settings of data inspection, the erecting direction (angle) of the bar code region is selected by the inspection operator. This setting operation requires the inspection operator to perform a setting operation a number of times corresponding to the number of bar code regions, which increases the workload of the inspection operator.

On the other hand, in the second embodiment, one of four sides forming a bar code region, which is closest to a character region, is identified and the erecting direction of the bar code inspection region is set based on the result of the identification.

Figure 12:
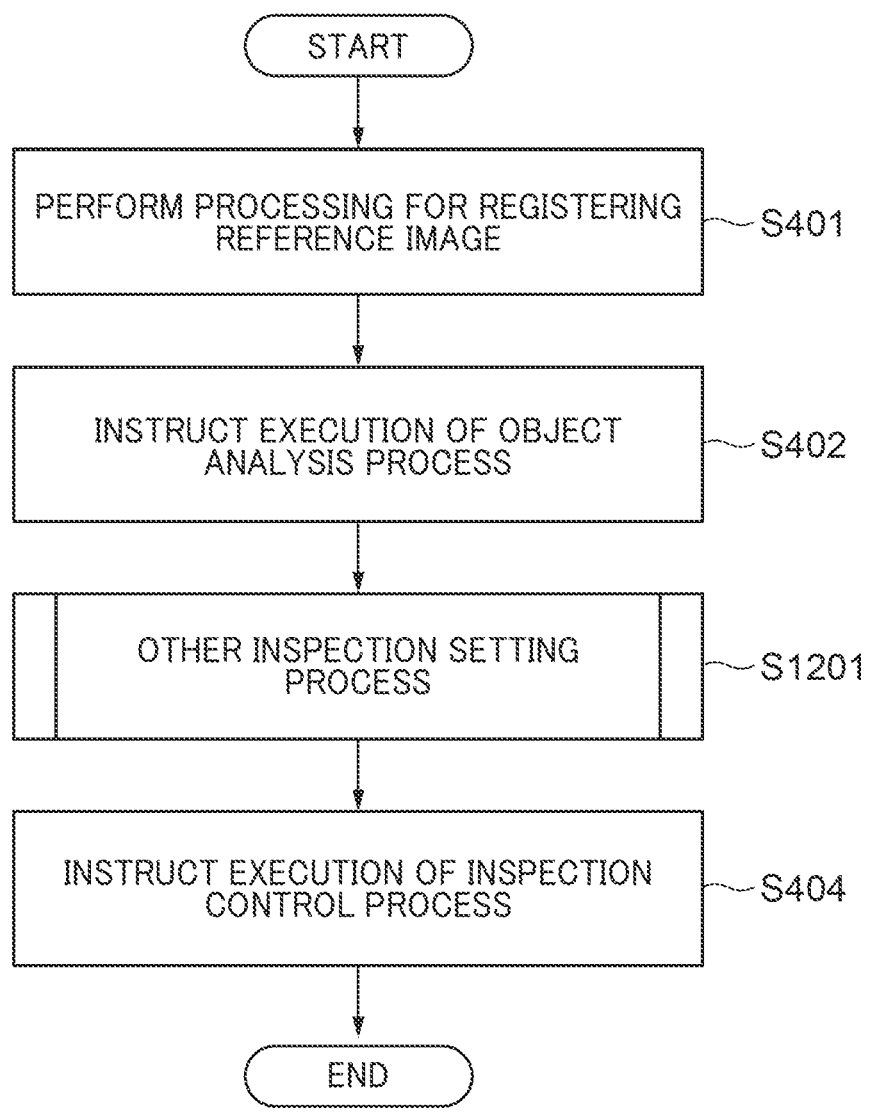
FIG. 12 is a flowchart showing the whole process of inspection performed by the inspection apparatus appearing in FIG. 1 from registration work before starting inspection to execution of the inspection.

FIG. 12 is a flowchart showing the whole process of inspection performed by the inspection apparatus 102 appearing in FIG. 1 from registration work before starting inspection to execution of the inspection. The process in FIG. 12 is similar to the process in FIG. 4, and the following description will be given of processing different from processing in the process in FIG. 4. Similar to the steps in FIG. 4, the steps in FIG. 12 are also realized by the CPU 304 that executes a program stored in the ROM 306.

Referring to FIG. 12, the above-mentioned step S401 is executed. Note that in the step S401 in FIG. 12, it is assumed that a reference image 1301 shown in FIG. 13A has been registered. Then, the above-described step S402 is executed. In the step S402 in FIG. 12, for example, a region 1302 appearing in FIG. 13B is determined as a photo region, a region 1303 and a region 1305 are determined as character regions, and a region 1304 is determined as a bar code region. Further, in the step S402 in FIG. 12, items of object information corresponding to these regions are recorded in a list 1306 shown in FIG. 13C, and the list 1306 is stored in the RAM 305. Note that in the list 1306, an ID of "0" is assigned to an item of object information associated with the region 1302, and an ID of "1" is assigned to an item of object information associated with the region 1303. Further, an ID of "2" is assigned to an item of object information associated with the region 1304, and an ID of "3" is assigned to an item of object information associated with the region 1305.

Then, in a step S1201, the CPU 304 performs another inspection setting process, described hereinafter with reference to FIG. 14, and automatically sets the inspection regions and the inspection types. Then, the above-described step S404 is executed.

Figure 14:
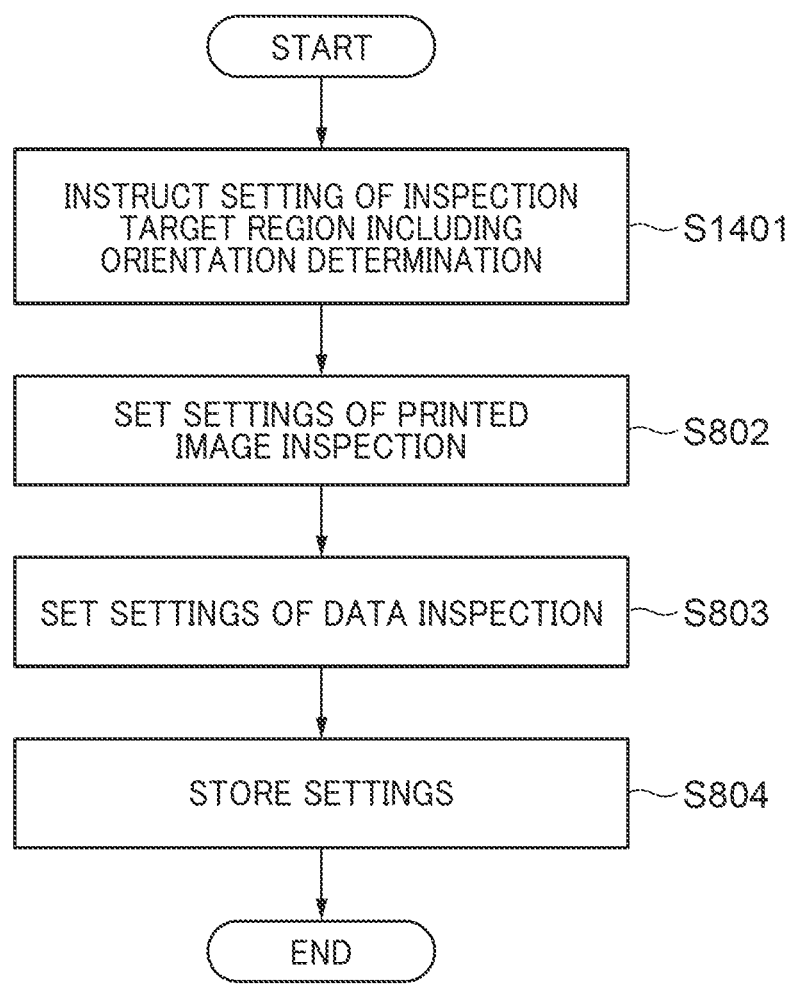
FIG. 14 is a flowchart of another inspection setting process executed in a step in FIG. 12.

FIG. 14 is a flowchart of the other inspection setting process in the step S1201 in FIG. 12. The other inspection setting process in FIG. 14 is similar to the inspection setting process in FIG. 8, and the following description will be given of processing different from processing in the inspection setting process in FIG. 8.

Referring to FIG. 14, first, in a step S1401, the CPU 304 instructs the inspection setting section 309 to set the settings of the inspection region including orientation determination. The inspection setting section 309 having received this instruction executes another inspection region-setting process in FIG. 15. Then, the steps S802 to S804 are executed, followed by terminating the other inspection setting process.

Figure 15:
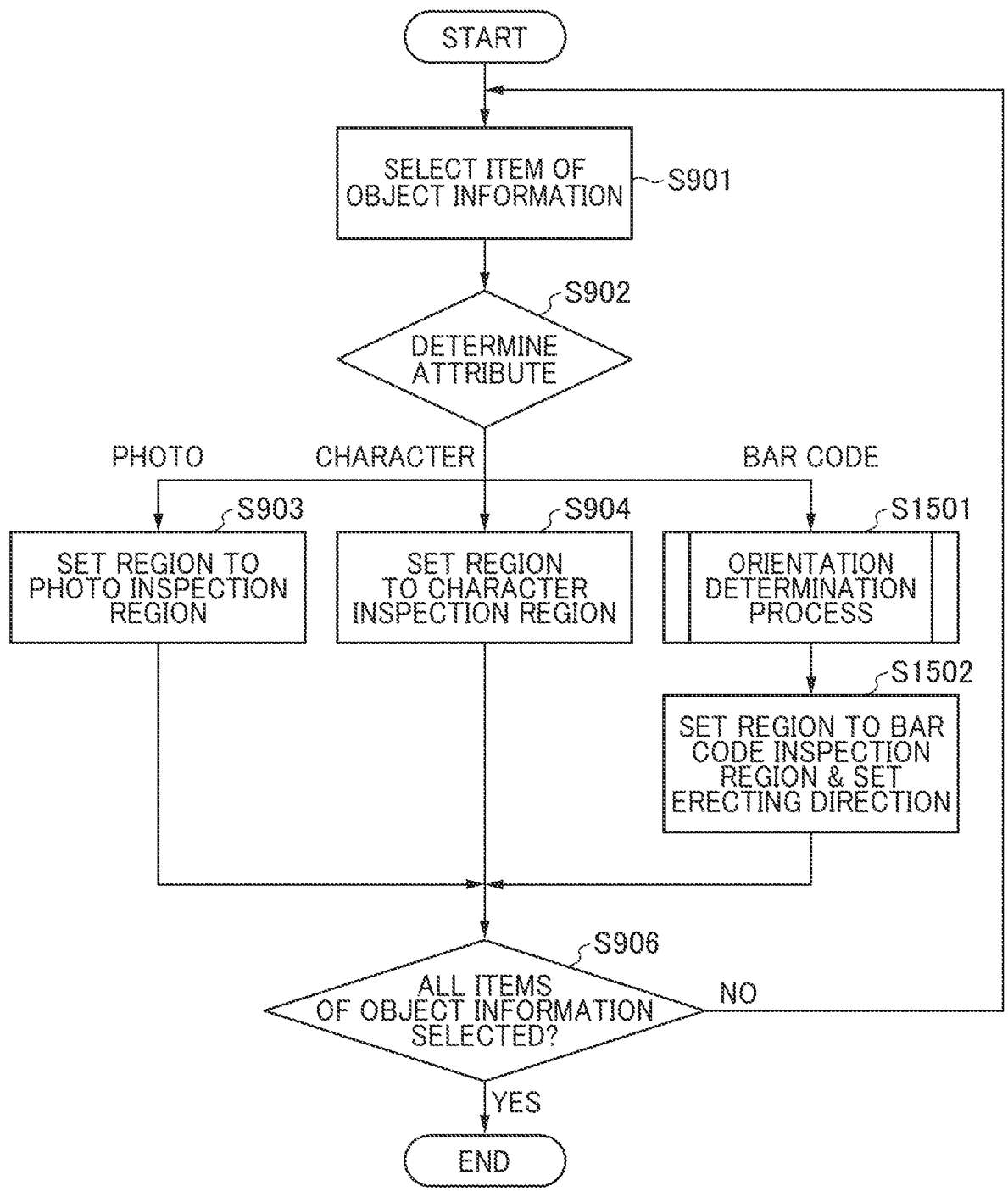
FIG. 15 is a flowchart of another inspection region-setting process performed by the inspection setting section according to an instruction provided in a step in FIG. 14.

FIG. 15 is a flowchart of the other inspection region-setting process performed by the inspection setting section 309 according to the instruction provided in the step S1401 in FIG. 14. Note that the other inspection region-setting process in FIG. 15 is similar to the inspection region-setting process in FIG. 9, and the following description will be given of processing different from processing in the inspection region-setting process in FIG. 9.

Referring to FIG. 15, first, the above-described steps S901 and S902 are executed.

If it is determined in the step S902 that the attribute of the region is a photo, the steps S903 and S906 are executed. If it is determined in the step S902 that the attribute of the region is a character, the steps S904 and S906 are executed.

Figure 16:
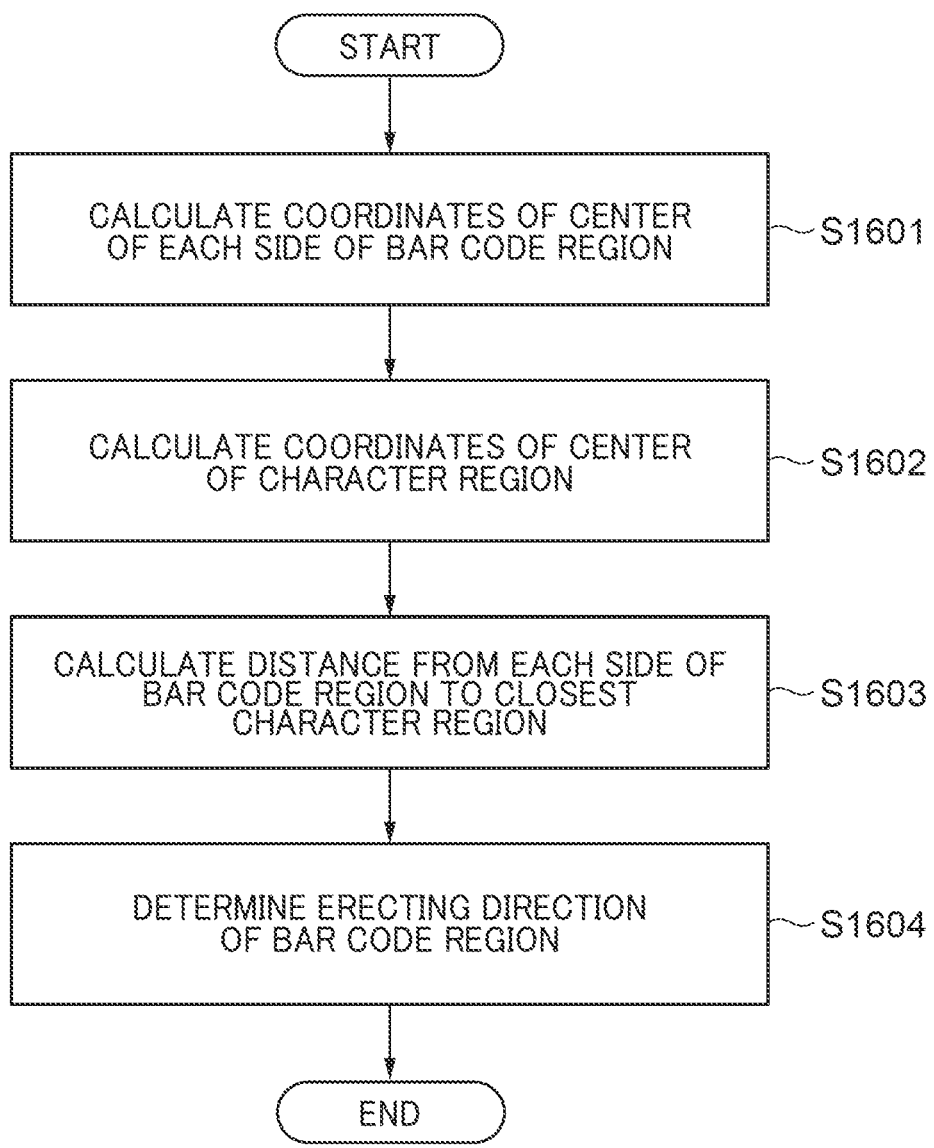
FIG. 16 is a flowchart of an orientation determination process executed in a step in FIG. 15.

If it is determined in the step S902 that the attribute of the region is a bar code, the inspection setting section 309 performs an orientation determination process in FIG. 16 (step S1501).

FIG. 16 is a flowchart of the orientation determination process in the step S1501 in FIG. 15.

Referring to FIG. 16, first, in a step S1601, the inspection setting section 309 calculates, based on the coordinate information included in an item of object information selected in the step S901, coordinates of the center of each of upper, lower, right, and left sides of the region (bar code region) associated with the selected item of object information. For example, as for the coordinates of the center of the upper side, the x coordinate is an average value of a value of an x coordinate of an upper left corner of the bar code region and a value of an x coordinate of an upper right corner of the same, and the y coordinate is a value of a y coordinate of the upper left corner of the bar code region. As for the coordinates of the center of the lower side, the x coordinate is an average value of a value of an x coordinate of a lower left corner of the bar code region and a value of an x coordinate of a lower right corner of the same, and the y coordinate is a value of a y coordinate of the lower right corner of the bar code region. As for the coordinates of the center of the right side, the x coordinate is the value of the x coordinate of the lower right corner of the bar code region, and the y coordinate is an average value of the value of they coordinate of the upper left corner of the bar code region and a value of the y coordinate of the lower right corner of the same. As for the coordinates of the center of the left side, the x coordinate is the value of the x coordinate of the upper left corner of the bar code region, and the y coordinate is an average value of the value of the y coordinate of the upper left corner of the bar code region and the value of the y coordinate of the lower left corner of the same.

Figure 13A:
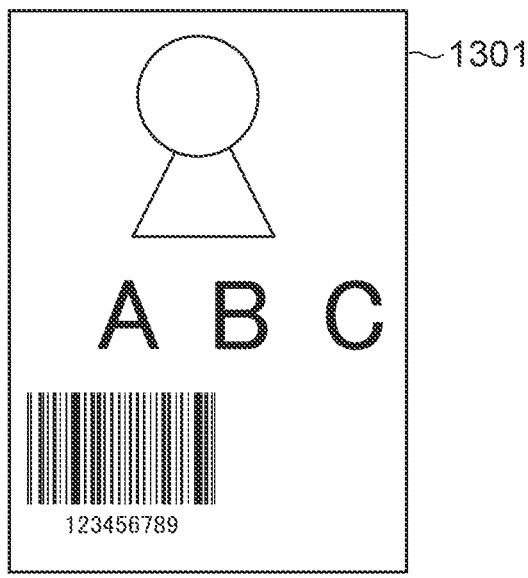
FIGS. 13A to 13C are diagrams useful in explaining a step in FIG. 12.
Figure 13B:
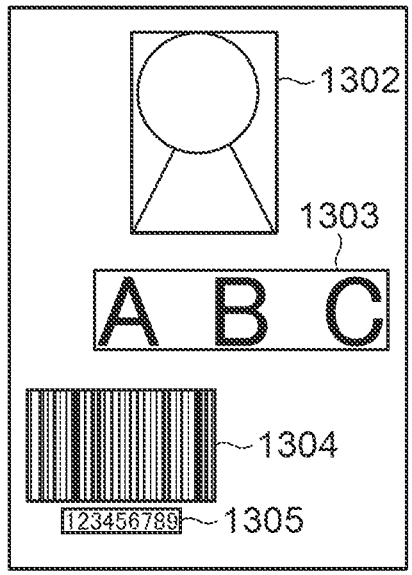
Figure 13C:
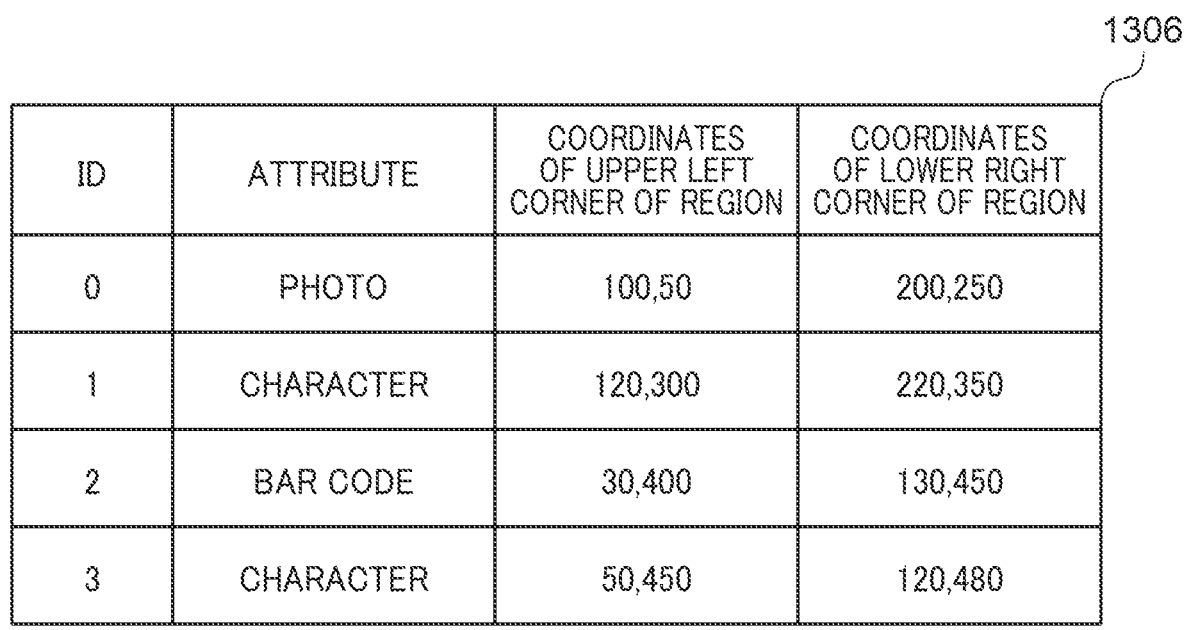

As a result of the above-described calculation, in the example shown in FIGS. 13A to 13C, the coordinates of the center of the upper side of the bar code region are represented by (80, 400), the coordinates of the center of the lower side are represented by (80, 450), the coordinates of the center of the right side are represented by (130, 425), and the coordinates of the center of the left side are represented by (30, 425).

Then, in a step S1602, the inspection setting section 309 calculates the coordinates of the center of each character region based on the object information acquired from the list 1306. For example, an average value of an x coordinate of an upper left corner and an x coordinate of a lower right corner of the character region is set as the x coordinate of the center the character region, and an average value of a value of a y coordinate of the upper left corner and a y coordinate of the lower right corner of the character region is set as the y coordinate of the center of of the character region. In the list 1306, the object information of the ID of "1" and the object information of the ID of "3" are the respective items of object information of the character regions. The coordinates of the center of the character region associated with the item of object information of the ID of "1" are represented by (170, 325), and the coordinates of the center of the character region associated with the item of object information of the ID of "3" are represented by (85, 465).

Then, in a step S1603, the inspection setting section 309 calculates a distance form each side of the bar code region to the closest character region. Specifically, the inspection setting section 309 calculates a distance from the coordinates of the center of each side of the bar code region to the coordinates of the center of each character region calculated in the step S1602. In the present embodiment, as the method of calculating the distance, for example, the square of Euclidean distance is used. With this, for example, the distance from the coordinates of the center of the upper side of the bar code region to the coordinates of the center of the character region associated with the item of object information of the ID of "1" is 13725. Further, the distance from the coordinates of the center of the upper side of the bar code region to the coordinates of the center of the character region associated with the item of object information of the ID of "3" is 4250. The inspection setting section 309 selects 4250 out of these two distances as the distance from the upper side of the bar code region to the character region closest to this upper side (hereinafter referred to as the "shortest distance from the upper side to the character region"). Similarly, calculation performed with respect to the lower side, the right side, and the left side shows that the shortest distance from the lower side to the character region is 250, the shortest distance from the right side to the character region is 3625, and the shortest distance from the left side to the character region is 4625. Note that the method of calculating the distance is not limited to the above-mentioned method, but for example, the Euclidean distance may be directly used.

Then, in a step S1604, the inspection setting section 309 identifies a closest one of the four sides forming the bar code region to the character region and determines the erecting direction of the bar code inspection region based on the result of the identification. Specifically, the inspection setting section 309 determines one of the four sides forming the bar code region, of which the shortest distance calculated in the step S1603 has the minimum value, as the side closest to the character region, and an opposite side of the determined side is determined to exist at a location in the erecting direction. This is the determination method based on a form in which a number is written under a bar code in a general bar code standard, such as a so-called EAN. For example, in the above-described example, the lower one of the four sides forming the bar code region, which has the minimum value of the shortest distance calculated in the step S1603, is identified as the side closest to the character region, and the opposite side of the lower side, i.e. the "upper side" is determined to exist in the erecting direction. Then, the orientation determination process is terminated, and a step S1502 is executed in FIG. 15.

In the step S1502, the inspection setting section 309 sets a region associated with the item of object information selected in the step S901 as the bar code inspection region, and sets the erecting direction of this region to the direction determined in the step S1604. Then, the step S906 in the other inspection region-setting process in FIG. 15 is executed. Thereafter, when the other inspection region-setting process is terminated, a setting screen 1700 shown in FIG. 17 having the same configuration as the setting screen 1001 is displayed on the UI section 302 of the inspection apparatus 102. A region 1701 of the reference image displayed in the image display area 1002 of the setting screen 1700 is a region set as the photo inspection region in the step S903 in FIG. 15. A region 1702 and a region 1703 of the reference image are regions set as the character inspection regions in the step S904 in FIG. 15. A region 1704 of the reference image is a region set as the bar code inspection region in the step S1502. For example, in a case where the inspection operator selects the region 1704 in the image display area 1002, the character/bar code inspection setting area 1008 is made operable. At this time, the setting item 1010 is displayed in a state in which the direction setting button corresponding to the erecting direction set in the step S1502 is selected.

In the above-described embodiment, a closest one of the four sides forming the bar code region to the character region is identified, and the erecting direction of the bar code inspection region is set based on the result of the identification. Whit this, it is possible to set the erecting direction of the bar code inspection region with high accuracy without requiring the time and effort.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-137282, filed Aug. 25, 2021, which is hereby incorporated by reference herein in its entirety.

What is claimed is:

1. An inspection apparatus that performs inspection of a print product, comprising:
   at least one processor; and
   a memory coupled to the at least one processor, the memory having instructions that, when executed by the processor, perform the operations as:
   a reading unit configured to read the print product and generate a scanned image of the print product;
   a detection unit configured to detect a line region and a photo region from the scanned image;
   a determination unit configured to determine the line region as one of a character region and a bar code region;
   an inspection setting unit configured to set settings of inspection of the print product based on a result of detection performed by the detection unit and a result of determination performed by the determination unit; and
   an inspection processing unit configured to perform inspection of the print product based on the settings set by the inspection setting unit.

2. The inspection apparatus according to claim 1, wherein the determination unit determines the line region as one of a character region and a bar code region based on distribution information of luminance values in the line region.

3. The inspection apparatus according to claim 1, wherein the inspection of the print product includes inspection for detecting a defect in the print product.

4. The inspection apparatus according to claim 1, wherein the inspection of the print product includes inspection for checking whether or not a character string and a bar code on the print product are readable, and inspection in which results of reading a character string and a bar code on the print product are collated with reference data registered in advance.

5. The inspection apparatus according to claim 1, wherein the settings of the inspection of the print product includes settings of an inspection target region on the scanned image.

6. The inspection apparatus according to claim 1, wherein the settings of the inspection of the print product include settings of a type of inspection to be performed with respect to an inspection target region on the scanned image.

7. The inspection apparatus according to claim 1, wherein the settings of the inspection of the print product include settings of an erecting direction of the bar code region.

8. The inspection apparatus according to claim 7, wherein the inspection apparatus identifies one of four sides forming the bar code region, which is closest to the character region, and sets an erecting direction of the bar code region based on a result of the identification.

9. A method of controlling an inspection apparatus that performs inspection of a print product, comprising:
   reading the print product and generating a scanned image of the print product;
   detecting a line region and a photo region from the scanned image;
   determining the line region as one of a character region and a bar code region;
   setting settings of inspection of the print product based on a result of detection performed by said detecting and a result of determination performed by said determining; and
   performing the inspection of the print product based on the settings of the inspection.

10. A non-transitory computer-readable storage medium storing a program for causing a computer to execute a method of controlling an inspection apparatus,
   wherein the method comprises:
   reading the print product and generating a scanned image of the print product;
   detecting a line region and a photo region from the scanned image;
   determining the line region as one of a character region and a bar code region;
   setting settings of inspection of the print product based on a result of detection performed by said detecting and a result of determination performed by said determining; and
   performing the inspection of the print product based on the settings of the inspection.

* * * * *